(12) United States Patent
Kindig et al.

(10) Patent No.: US 9,011,154 B2
(45) Date of Patent: *Apr. 21, 2015

(54) VIRTUAL WELDING SYSTEM

(75) Inventors: Michael A. Kindig, Chagrin Falls, OH (US); Jason Leach, Cleveland Heights, OH (US); Antonius Aditjandra, Chardon, OH (US); Deanna Postlethwaite, Chagrin Falls, OH (US); Matt Bennett, West Haven, CT (US)

(73) Assignee: Lincoln Global, Inc., City of Industry, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/364,489

(22) Filed: Feb. 2, 2012

(65) Prior Publication Data

US 2012/0189993 A1    Jul. 26, 2012

Related U.S. Application Data

(63) Continuation-in-part of application No. 12/501,257, filed on Jul. 10, 2009.

(51) Int. Cl.
G09B 25/02 (2006.01)
G09B 19/24 (2006.01)

(52) U.S. Cl.
CPC ............... *G09B 19/24* (2013.01); *G09B 25/02* (2013.01)

(58) Field of Classification Search
USPC .......................................... 434/234; 345/419
See application file for complete search history.

(56) References Cited

U.S. PATENT DOCUMENTS

| 1,159,119 A | 11/1915 | Springer |
| D140,630 S | 3/1945 | Garibay |

(Continued)

FOREIGN PATENT DOCUMENTS

| CA | 2698078 | 9/2011 |
| CN | 201083660 Y | 7/2008 |

(Continued)

OTHER PUBLICATIONS

B. Virtual Reality Welder Training, Session 5: Joining Technologies for Naval Applications, by Nancy C. Porter, Edison Welding Institute J. Allan Cote, General Dynamics Electric Boat; Timothy D. Gifford, VRSim; and Wim Lam, FCS Controls (1st posted on the Internet on Jul. 14, 2006).*

(Continued)

*Primary Examiner* — Robert J Utama
(74) *Attorney, Agent, or Firm* — Hahn Loeser & Parks LLP

(57) ABSTRACT

A virtual reality welding process and system is described which includes a programmable processor based subsystem, a spatial tracker operatively connected to the programmable processor based subsystem, a mock welding tool capable of being spatially tracked by the spatial tracker in which the mock welding tool includes two or more adapters. Each adapter emulates the real-world appearance of a particular weld type and interfaces with a base that is removably coupled to each of the two or more adapters. The base has one or more sensors to determine spatial location relative to the spatial tracker. The programmable processor based subsystem executes an appropriate instruction set associated with each adapter to render a display to the user on a face-mounted display device commensurate for each of the two or more adapters.

22 Claims, 25 Drawing Sheets

(56) References Cited

U.S. PATENT DOCUMENTS

| | | |
|---|---|---|
| D142,377 S | 9/1945 | Dunn |
| D152,049 S | 12/1948 | Welch |
| 2,681,969 A | 6/1954 | Burke |
| D174,208 S | 3/1955 | Abidgaard |
| 2,728,838 A | 12/1955 | Barnes |
| D176,942 S | 2/1956 | Cross |
| 2,894,086 A | 7/1959 | Rizer |
| 3,035,155 A | 5/1962 | Hawk |
| 3,059,519 A | 10/1962 | Stanton |
| 3,356,823 A | 12/1967 | Waters et al. |
| 3,555,239 A | 1/1971 | Kerth |
| 3,621,177 A | 11/1971 | McPherson et al. |
| 3,654,421 A | 4/1972 | Streetman et al. |
| 3,739,140 A | 6/1973 | Rotilio |
| 3,866,011 A | 2/1975 | Cole |
| 3,867,769 A | 2/1975 | Schow et al. |
| 3,904,845 A | 9/1975 | Minkiewicz |
| 3,988,913 A | 11/1976 | Metcalfe et al. |
| D243,459 S | 2/1977 | Bliss |
| 4,024,371 A | 5/1977 | Drake |
| 4,041,615 A | 8/1977 | Whitehill |
| D247,421 S | 3/1978 | Driscoll |
| 4,124,944 A | 11/1978 | Blair |
| 4,132,014 A | 1/1979 | Schow |
| 4,237,365 A | 12/1980 | Lambros et al. |
| 4,280,050 A | 7/1981 | Callender et al. |
| 4,280,137 A | 7/1981 | Ashida et al. |
| 4,314,125 A | 2/1982 | Nakamura |
| 4,359,622 A | 11/1982 | Dostoomian et al. |
| 4,375,026 A | 2/1983 | Kearney |
| 4,410,787 A | 10/1983 | Kremers et al. |
| 4,429,266 A | 1/1984 | Tradt |
| 4,452,589 A | 6/1984 | Denison |
| D275,292 S | 8/1984 | Bouman |
| D277,761 S | 2/1985 | Korovin et al. |
| D280,329 S | 8/1985 | Bouman |
| 4,611,111 A | 9/1986 | Baheti et al. |
| 4,616,326 A | 10/1986 | Meier et al. |
| 4,629,860 A | 12/1986 | Lindbom |
| 4,677,277 A | 6/1987 | Cook et al. |
| 4,680,014 A | 7/1987 | Paton et al. |
| 4,689,021 A | 8/1987 | Vasiliev et al. |
| 4,707,582 A | 11/1987 | Beyer |
| 4,716,273 A | 12/1987 | Paton et al. |
| D297,704 S | 9/1988 | Bulow |
| 4,867,685 A | 9/1989 | Brush et al. |
| 4,877,940 A | 10/1989 | Bangs et al. |
| 4,897,521 A | 1/1990 | Burr |
| 4,907,973 A | 3/1990 | Hon |
| 4,931,018 A | 6/1990 | Herbst et al. |
| 4,998,050 A | 3/1991 | Nishiyama et al. |
| 5,034,593 A | 7/1991 | Rice et al. |
| 5,061,841 A | 10/1991 | Richardson |
| 5,089,914 A | 2/1992 | Prescott |
| 5,192,845 A | 3/1993 | Kirmsse et al. |
| 5,206,472 A | 4/1993 | Myking et al. |
| 5,266,930 A | 11/1993 | Ichikawa et al. |
| 5,285,916 A | 2/1994 | Ross |
| 5,305,183 A | 4/1994 | Teynor |
| 5,320,538 A | 6/1994 | Baum |
| 5,337,611 A | 8/1994 | Fleming et al. |
| 5,360,156 A | 11/1994 | Ishizaka et al. |
| 5,360,960 A | 11/1994 | Shirk |
| 5,370,071 A | 12/1994 | Ackermann |
| D359,296 S | 6/1995 | Witherspoon |
| 5,424,634 A | 6/1995 | Goldfarb et al. |
| 5,436,638 A | 7/1995 | Bolas et al. |
| 5,464,957 A | 11/1995 | Kidwell et al. |
| D365,583 S | 12/1995 | Viken |
| 5,562,843 A | 10/1996 | Yasumoto |
| 5,670,071 A | 9/1997 | Ueyama et al. |
| 5,676,503 A | 10/1997 | Lang |
| 5,676,867 A | 10/1997 | Van Allen |
| 5,708,253 A | 1/1998 | Bloch et al. |
| 5,710,405 A | 1/1998 | Solomon et al. |
| 5,719,369 A | 2/1998 | White et al. |
| D392,534 S | 3/1998 | Degen et al. |
| 5,728,991 A | 3/1998 | Takada et al. |
| 5,751,258 A | 5/1998 | Fergason et al. |
| D395,269 S | 6/1998 | McCauley, Jr. |
| D396,238 S | 7/1998 | Schmitt |
| 5,781,258 A | 7/1998 | Dabral et al. |
| 5,823,785 A | 10/1998 | Matherne, Jr. |
| 5,835,077 A | 11/1998 | Dao et al. |
| 5,835,277 A | 11/1998 | Hegg |
| 5,845,053 A | 12/1998 | Watanabe et al. |
| 5,963,891 A | 10/1999 | Walker et al. |
| 6,008,470 A | 12/1999 | Zhang et al. |
| 6,049,059 A | 4/2000 | Kim |
| 6,051,805 A | 4/2000 | Vaidya et al. |
| 6,114,645 A | 9/2000 | Burgess |
| 6,155,475 A | 12/2000 | Ekelof et al. |
| 6,155,928 A | 12/2000 | Burdick |
| 6,230,327 B1 | 5/2001 | Briand et al. |
| 6,236,013 B1 | 5/2001 | Delzenne |
| 6,236,017 B1 | 5/2001 | Smartt et al. |
| 6,242,711 B1 | 6/2001 | Cooper |
| 6,271,500 B1 | 8/2001 | Hirayama et al. |
| 6,330,938 B1 | 12/2001 | Herve et al. |
| 6,330,966 B1 | 12/2001 | Eissfeller |
| 6,331,846 B1 | 12/2001 | Nakao |
| D456,428 S | 4/2002 | Aronson et al. |
| 6,373,465 B2 | 4/2002 | Jolly et al. |
| D456,828 S | 5/2002 | Aronson et al. |
| D461,383 S | 8/2002 | Blackburn |
| 6,441,342 B1 | 8/2002 | Hsu |
| 6,445,964 B1 | 9/2002 | White et al. |
| 6,506,997 B2 | 1/2003 | Matsuyama |
| 6,552,303 B1 | 4/2003 | Blankenship et al. |
| 6,560,029 B1 | 5/2003 | Dobbie et al. |
| 6,563,489 B1 | 5/2003 | Latypov et al. |
| 6,568,846 B1 | 5/2003 | Cote et al. |
| D475,726 S | 6/2003 | Suga et al. |
| 6,572,379 B1 | 6/2003 | Sears et al. |
| 6,583,386 B1 | 6/2003 | Ivkovich |
| 6,621,049 B2 | 9/2003 | Suzuki |
| 6,624,388 B1 | 9/2003 | Blankenship et al. |
| D482,171 S | 11/2003 | Vui et al. |
| 6,647,288 B2 | 11/2003 | Madill et al. |
| 6,649,858 B2 | 11/2003 | Wakeman |
| 6,655,645 B1 | 12/2003 | Lu et al. |
| 6,660,965 B2 | 12/2003 | Simpson |
| 6,697,701 B2 | 2/2004 | Hillen et al. |
| 6,697,770 B1 | 2/2004 | Nagetgaal |
| 6,703,585 B2 | 3/2004 | Suzuki |
| 6,708,385 B1 | 3/2004 | Lemelson |
| 6,710,298 B2 | 3/2004 | Eriksson |
| 6,710,299 B2 | 3/2004 | Blankenship et al. |
| 6,715,502 B1 | 4/2004 | Rome et al. |
| D490,347 S | 5/2004 | Meyers |
| 6,730,875 B2 | 5/2004 | Hsu |
| 6,734,393 B1 | 5/2004 | Friedl et al. |
| 6,744,011 B1 | 6/2004 | Hu et al. |
| 6,750,428 B2 | 6/2004 | Okamoto et al. |
| 6,768,974 B1 | 7/2004 | Nanjundan et al. |
| 6,772,802 B2 | 8/2004 | Few |
| 6,788,442 B1 | 9/2004 | Potin et al. |
| 6,795,778 B2 | 9/2004 | Dodge et al. |
| 6,798,974 B1 | 9/2004 | Nakano et al. |
| 6,857,553 B1 | 2/2005 | Hartman et al. |
| 6,858,817 B2 | 2/2005 | Blankenship et al. |
| 6,865,926 B2 | 3/2005 | O'Brien et al. |
| D504,449 S | 4/2005 | Butchko |
| 6,920,371 B2 | 7/2005 | Hillen et al. |
| 6,940,039 B2 | 9/2005 | Blankenship et al. |
| 7,021,937 B2 | 4/2006 | Simpson et al. |
| 7,126,078 B2 | 10/2006 | Demers et al. |
| 7,132,617 B2 | 11/2006 | Lee et al. |
| 7,170,032 B2 | 1/2007 | Flood |
| 7,194,447 B2 | 3/2007 | Harvey et al. |
| 7,247,814 B2 | 7/2007 | Ott |
| D555,446 S | 11/2007 | Picaza Ibarrondo |
| 7,353,715 B2 | 4/2008 | Myers |
| 7,363,137 B2 | 4/2008 | Brant et al. |

(56) References Cited

U.S. PATENT DOCUMENTS

| | | |
|---|---|---|
| 7,375,304 B2 | 5/2008 | Kainec et al. |
| 7,381,923 B2 | 6/2008 | Gordon et al. |
| 7,414,595 B1 | 8/2008 | Muffler |
| 7,465,230 B2 | 12/2008 | LeMay et al. |
| 7,478,108 B2 | 1/2009 | Townsend et al. |
| D587,975 S | 3/2009 | Aronson, II et al. |
| 7,516,022 B2 | 4/2009 | Lee et al. |
| D602,057 S | 10/2009 | Osicki |
| 7,621,171 B2 | 11/2009 | O'Brien |
| D606,102 S | 12/2009 | Bender et al. |
| 7,643,890 B1 | 1/2010 | Hillen et al. |
| 7,687,741 B2 | 3/2010 | Kainec et al. |
| D614,217 S | 4/2010 | Peters et al. |
| D615,573 S | 5/2010 | Peters et al. |
| 7,817,162 B2 | 10/2010 | Bolick et al. |
| 7,853,645 B2 | 12/2010 | Brown et al. |
| D631,074 S | 1/2011 | Peters et al. |
| 7,874,921 B2 | 1/2011 | Baszucki et al. |
| 7,970,172 B1 | 6/2011 | Hendrickson |
| 7,972,129 B2 | 7/2011 | O'Donoghue |
| 7,991,587 B2 | 8/2011 | Ihn |
| 8,069,017 B2 | 11/2011 | Hallquist |
| 8,224,881 B1 | 7/2012 | Spear et al. |
| 8,248,324 B2 | 8/2012 | Nangle |
| 8,265,886 B2 | 9/2012 | Bisiaux et al. |
| 8,274,013 B2 | 9/2012 | Wallace |
| 8,287,522 B2 | 10/2012 | Moses et al. |
| 8,316,462 B2 | 11/2012 | Becker et al. |
| 8,363,048 B2 | 1/2013 | Gering |
| 8,365,603 B2 | 2/2013 | Lesage et al. |
| 8,569,646 B2 | 10/2013 | Daniel et al. |
| 8,777,629 B2 | 7/2014 | Kreindl et al. |
| 2001/0045808 A1 | 11/2001 | Hietmann et al. |
| 2001/0052893 A1 | 12/2001 | Jolly et al. |
| 2002/0032553 A1 | 3/2002 | Simpson et al. |
| 2002/0046999 A1 | 4/2002 | Veikkolainen |
| 2002/0050984 A1 | 5/2002 | Roberts |
| 2002/0085843 A1 | 7/2002 | Mann |
| 2002/0175897 A1 | 11/2002 | Pelosi |
| 2003/0000931 A1 | 1/2003 | Ueda et al. |
| 2003/0023592 A1 | 1/2003 | Modica et al. |
| 2003/0025884 A1 | 2/2003 | Hamana et al. |
| 2003/0106787 A1 | 6/2003 | Santilli |
| 2003/0111451 A1 | 6/2003 | Blankenship et al. |
| 2003/0172032 A1 | 9/2003 | Choquet |
| 2003/0223592 A1 | 12/2003 | Deruginsky et al. |
| 2003/0234885 A1 | 12/2003 | Pilu |
| 2004/0020907 A1 | 2/2004 | Zauner et al. |
| 2004/0035990 A1 | 2/2004 | Ackeret |
| 2004/0050824 A1 | 3/2004 | Samler |
| 2004/0140301 A1 | 7/2004 | Blankenship et al. |
| 2005/0007504 A1 | 1/2005 | Fergason |
| 2005/0017152 A1 | 1/2005 | Fergason |
| 2005/0046584 A1 | 3/2005 | Breed |
| 2005/0050168 A1 | 3/2005 | Wen et al. |
| 2005/0101767 A1 | 5/2005 | Clapham et al. |
| 2005/0103766 A1 | 5/2005 | Iizuka et al. |
| 2005/0103767 A1 | 5/2005 | Kainec et al. |
| 2005/0109735 A1 | 5/2005 | Flood |
| 2005/0128186 A1 | 6/2005 | Shahoian et al. |
| 2005/0133488 A1 | 6/2005 | Blankenship |
| 2005/0159840 A1 | 7/2005 | Lin et al. |
| 2005/0189336 A1 | 9/2005 | Ku |
| 2005/0199602 A1 | 9/2005 | Kaddani et al. |
| 2005/0230573 A1 | 10/2005 | Ligertwood |
| 2005/0252897 A1 | 11/2005 | Hsu |
| 2005/0275913 A1 | 12/2005 | Vesely et al. |
| 2005/0275914 A1 | 12/2005 | Vesely et al. |
| 2006/0014130 A1 | 1/2006 | Weinstein |
| 2006/0136183 A1 | 6/2006 | Choquet |
| 2006/0163227 A1 | 7/2006 | Hillen et al. |
| 2006/0169682 A1 | 8/2006 | Kainec et al. |
| 2006/0173619 A1 | 8/2006 | Brant et al. |
| 2006/0189260 A1 | 8/2006 | Sung |
| 2006/0207980 A1 | 9/2006 | Jacovetty et al. |
| 2006/0213892 A1 | 9/2006 | Ott |
| 2006/0214924 A1 | 9/2006 | Kawamoto et al. |
| 2006/0226137 A1 | 10/2006 | Huismann et al. |
| 2006/0252543 A1 | 11/2006 | Van Noland et al. |
| 2006/0258447 A1 | 11/2006 | Baszucki et al. |
| 2007/0034611 A1 | 2/2007 | Drius et al. |
| 2007/0038400 A1 | 2/2007 | Lee et al. |
| 2007/0045488 A1 | 3/2007 | Shin |
| 2007/0088536 A1 | 4/2007 | Ishikawa |
| 2007/0112889 A1 | 5/2007 | Cook et al. |
| 2007/0198117 A1 | 8/2007 | Wajihuddin |
| 2007/0211026 A1 | 9/2007 | Ohta |
| 2007/0221797 A1 | 9/2007 | Thompson et al. |
| 2007/0256503 A1 | 11/2007 | Wong et al. |
| 2007/0277611 A1 | 12/2007 | Portzgen et al. |
| 2007/0291035 A1 | 12/2007 | Vesely et al. |
| 2008/0031774 A1 | 2/2008 | Magnant et al. |
| 2008/0038702 A1 | 2/2008 | Choquet |
| 2008/0078811 A1 | 4/2008 | Hillen et al. |
| 2008/0078812 A1 | 4/2008 | Peters et al. |
| 2008/0117203 A1 | 5/2008 | Gering |
| 2008/0128398 A1 | 6/2008 | Schneider |
| 2008/0135533 A1 | 6/2008 | Ertmer et al. |
| 2008/0140815 A1 | 6/2008 | Brant et al. |
| 2008/0149686 A1 | 6/2008 | Daniel et al. |
| 2008/0203075 A1 | 8/2008 | Feldhausen et al. |
| 2008/0233550 A1 | 9/2008 | Solomon |
| 2008/0314887 A1 | 12/2008 | Stoger et al. |
| 2009/0015585 A1 | 1/2009 | Klusza |
| 2009/0021514 A1* | 1/2009 | Klusza .................. 345/419 |
| 2009/0045183 A1 | 2/2009 | Artelsmair et al. |
| 2009/0057286 A1 | 3/2009 | Ihara et al. |
| 2009/0152251 A1 | 6/2009 | Dantinne et al. |
| 2009/0173726 A1 | 7/2009 | Davidson et al. |
| 2009/0184098 A1 | 7/2009 | Daniel et al. |
| 2009/0200281 A1 | 8/2009 | Hampton |
| 2009/0200282 A1 | 8/2009 | Hampton |
| 2009/0231423 A1 | 9/2009 | Becker et al. |
| 2009/0259444 A1 | 10/2009 | Dolansky et al. |
| 2009/0298024 A1 | 12/2009 | Batzler et al. |
| 2009/0325699 A1 | 12/2009 | Delgiannidis |
| 2010/0012017 A1 | 1/2010 | Miller |
| 2010/0012637 A1 | 1/2010 | Jaeger |
| 2010/0048273 A1 | 2/2010 | Wallace et al. |
| 2010/0062405 A1* | 3/2010 | Zboray et al. .................. 434/234 |
| 2010/0062406 A1* | 3/2010 | Zboray et al. .................. 434/234 |
| 2010/0096373 A1 | 4/2010 | Hillen et al. |
| 2010/0121472 A1 | 5/2010 | Babu et al. |
| 2010/0133247 A1 | 6/2010 | Mazumder et al. |
| 2010/0133250 A1 | 6/2010 | Sardy et al. |
| 2010/0176107 A1 | 7/2010 | Bong |
| 2010/0201803 A1 | 8/2010 | Melikian |
| 2010/0224610 A1 | 9/2010 | Wallace |
| 2010/0276396 A1 | 11/2010 | Cooper et al. |
| 2010/0299101 A1 | 11/2010 | Shimada et al. |
| 2010/0307249 A1 | 12/2010 | Lesage et al. |
| 2011/0006047 A1 | 1/2011 | Penrod et al. |
| 2011/0060568 A1 | 3/2011 | Goldfine et al. |
| 2011/0091846 A1 | 4/2011 | Kreindl et al. |
| 2011/0114615 A1 | 5/2011 | Daniel et al. |
| 2011/0116076 A1 | 5/2011 | Chantry et al. |
| 2011/0117527 A1 | 5/2011 | Conrardy et al. |
| 2011/0122495 A1 | 5/2011 | Togashi |
| 2011/0183304 A1* | 7/2011 | Wallace et al. ............... 434/234 |
| 2011/0248864 A1 | 10/2011 | Becker et al. |
| 2011/0316516 A1 | 12/2011 | Schiefermuller et al. |
| 2012/0189993 A1 | 7/2012 | Kindig et al. |
| 2012/0291172 A1 | 11/2012 | Wills et al. |
| 2013/0026150 A1 | 1/2013 | Chantry et al. |
| 2013/0075380 A1 | 3/2013 | Albrech et al. |
| 2013/0189657 A1 | 7/2013 | Wallace et al. |
| 2013/0189658 A1 | 7/2013 | Peters et al. |
| 2014/0134580 A1 | 5/2014 | Becker |

FOREIGN PATENT DOCUMENTS

| | | |
|---|---|---|
| CN | 101419755 A1 | 4/2009 |
| CN | 201229711 Y | 4/2009 |
| CN | 101571887 A | 11/2009 |

(56) References Cited

FOREIGN PATENT DOCUMENTS

| | | |
|---|---|---|
| CN | 101587659 A | 11/2009 |
| DE | 28 33 638 A1 | 2/1980 |
| DE | 30 46 634 A1 | 7/1982 |
| DE | 32 44 307 A1 | 5/1984 |
| DE | 35 22 581 A1 | 1/1987 |
| DE | 4037879 A1 | 6/1991 |
| DE | 196 15 069 A1 | 10/1997 |
| DE | 197 39 720 A1 | 10/1998 |
| DE | 19834205 A1 | 2/2000 |
| DE | 200 09 543 A1 | 8/2001 |
| DE | 10 2005 047 204 A1 | 4/2007 |
| DE | 10 2010 038 902 A1 | 9/2012 |
| EP | 0 108 599 A1 | 5/1984 |
| EP | 0 127 299 A1 | 12/1984 |
| EP | 0 145 891 A1 | 6/1985 |
| EP | 0319623 B1 | 10/1990 |
| EP | 852986 A1 | 7/1998 |
| EP | 1 527 852 A1 | 5/2005 |
| EP | 1905533 A2 | 2/2008 |
| ES | 2 274 736 A1 | 5/2007 |
| FR | 1456780 A | 10/1966 |
| FR | 2 827 066 A1 | 1/2003 |
| FR | 2 926 660 A1 | 7/2009 |
| GB | 1 455 972 | 11/1976 |
| GB | 1 511 608 | 5/1978 |
| GB | 2 254 172 A | 4/1992 |
| GB | 2435838 A | 9/2007 |
| GB | 2 454 232 A | 6/2009 |
| JP | 2-224877 A | 9/1990 |
| JP | 05-329645 A | 12/1993 |
| JP | 07-047471 A | 2/1995 |
| JP | 07-232270 A | 9/1995 |
| JP | 08-132274 A | 5/1996 |
| JP | 08-150476 A | 6/1996 |
| JP | 08-505091 A | 6/1996 |
| JP | 2000-167666 A | 6/2000 |
| JP | 2001-071140 A | 3/2001 |
| JP | 2003-200372 A | 7/2003 |
| JP | 2003-326362 A | 11/2003 |
| JP | 2006-281270 A | 10/2006 |
| JP | 2007-290025 A | 11/2007 |
| JP | 2009-500178 A | 1/2009 |
| JP | 2009160636 A | 7/2009 |
| KR | 20090010693 | 1/2009 |
| RU | 2008 108 601 A | 11/2009 |
| SU | 1038963 A1 | 8/1983 |
| WO | 98/45078 | 10/1998 |
| WO | 0112376 A1 | 2/2001 |
| WO | 01/43910 | 6/2001 |
| WO | 0158400 A1 | 8/2001 |
| WO | 2005102230 A1 | 11/2005 |
| WO | 2006034571 | 4/2006 |
| WO | 2007039278 A1 | 4/2007 |
| WO | 2009120921 | 1/2009 |
| WO | 2009060231 A1 | 5/2009 |
| WO | 2009149740 A1 | 12/2009 |
| WO | 2010/000003 A2 | 1/2010 |
| WO | 2010044982 | 4/2010 |
| WO | 2010091493 A1 | 8/2010 |
| WO | 2011058433 | 5/2011 |
| WO | 2011/067447 A1 | 6/2011 |
| WO | 2011097035 A2 | 8/2011 |
| WO | 2012143327 A1 | 10/2012 |
| WO | 2013014202 A1 | 1/2013 |
| WO | 2013114189 A1 | 8/2013 |
| WO | 2014020386 | 2/2014 |

OTHER PUBLICATIONS

N. A. Tech., P/NA.3 Process Modelling and Optimization, 11 pages, Jun. 4, 2008.
FH Joanneum, Fronius—virtual welding, 2 pages, May 12, 2008.
Arc Simulation & Certification, Weld Into the Future, 6 pages, May 2008.
CS Wave, A Virtual learning tool for the welding motion, 10 pages, Mar. 14, 2008.
The Fabricator, Virtual Welding, 4 pages, Mar. 2008.
NSRP ASE, Low-Cost Virtual Reality Welder Training System, 1 page, 2008.
Edison Welding Institute, E-Weld Predictor, 3 pages, 2008.
CS Wave, The Virtual Welding Trainer, 6 pages, 2007.
asciencetutor.com, A division of Advanced Science and Automation Corp., VWL (Virtual Welding Lab), 2 pages, 2007.
Cooperative Research Program, Virtual Reality Welder Training, Summary Report SR0512, 4 pages, Jul. 2005.
Porter, et al., Virtual Reality Welder Training, Paper No. 2005-P19, 16 pages, 2005.
ARS Electronica LINZ GMBH, Fronius, 2 pages, May 18, 1997.
SIMFOR / CESOL, "RV-Sold" Welding Simulator, Technical and Functional Features, 20 pages, no date available.
Wang et al., Study on welder training by means of haptic guidance and virtual reality for arc welding, 2006 IEEE International Conference on Robotics and Biomimetics, ROBIO 2006 ISBN-10: 1424405718, p. 954-958.
White et al., Virtual welder trainer, 2009 IEEE Virtual Reality Conference, p. 303, 2009.
Mavrikios et al., A prototype virtual reality-based demonstrator for immersive and interactive simulation of welding processes, International Journal of Computer Integrated Manufacturing, vol. 19, Issue 3, Apr. 3, 2006, p. 294-300.
Arc+ simulator; http://www.123arc.com/en/depliant_ang.pdf; 2000.
Lindholm, Nickolls, Oberman, and Montrym, "NVIDIA Tesla: A Unified Graphics and Computing Architecture," IEEE Computer Society, 2008.
Hillis and Steel, Jr.; "Data Parallel Algorithms", Communications of the ACM, vol. 29, No. 12, p. 1170; Dec. 1986.
Mavrikios D et al, A prototype virtual reality-based demonstrator for immersive and interactive simulation of welding processes, International Journal of Computer Integrated Manufacturing, Taylor and Francis, Basingstoke, GB, vol. 19, No. 3, Apr. 1, 2006, pp. 294-300.
International Written Opinion for PCT/IB2009/00605.
International Search Report for PCT/IB2009/00605.
Juan Vicenete Rosell Gonzales, "RV-Sold: simulator virtual para la formacion de soldadores"; Deformacion Metalica, Es. vol. 34, No. 301, Jan. 1, 2008.
Choquet, Claude; "Arc+: Today's Virtual Reality Solution for Welders" Internet Page, Jan. 1, 2008.
Fast, K. et al., "Virtual Training for Welding", Mixed and Augmented Reality, 2004, ISMAR 2004, Third IEEE and CM International Symposium on Arlington, VA, Nov. 2-5, 2004.
U.S. Appl. No. 29/339,980, filed Jul. 10, 2009, issued May 11, 2010 as D615,573.
U.S. Appl. No. 29/339,979, filed Jul. 10, 2009, issued Apr. 20, 2010 as D614,217.
U.S. Appl. No. 29/339,978, filed Jul. 10, 2009.
U.S. Appl. No. 12/504,870, filed Jul. 17, 2009 claiming priority to U.S. Appl. No. 61/090,794.
U.S. Appl. No. 12/501,263, filed Jul. 10, 2009 claiming priority to U.S. Appl. No. 61/090,794.
U.S. Appl. No. 12/719,053, filed Mar. 8, 2010 claiming priority to U.S. Appl. No. 61/158,578.
International Search Report and Written Opinion from PCT/IB10/02913 dated Apr. 19, 2011.
"Design and Implementation of a Video Sensor for Closed Loop Control of Back Bead Weld Puddle Width," Robert Schoder, Massachusetts Institute of Technology, Dept. of Mechanical Engineering, May 27, 1983.
"Penetration in Spot GTA Welds during Centrifugation,"D.K. Aidun and S.A. Martin; Journal of Materials Engineering and Performance vol. 7(5) Oct. 1998—597.
Wade, "Human uses of ultrasound: ancient and modern", Ultrasonics vol. 38, dated 2000.
ASME Definitions, Consumables, Welding Positions, dated Mar. 19, 2001. See http://www.gowelding.com/wp/asme4.htm.
Code Aster (Software) EDF (France), Oct. 2001.

(56) References Cited

OTHER PUBLICATIONS

Mahrle, A., et al.; "the influence of fluid flow phenomena on the laser beam welding process" International Journal of Heat and Fluid Flow 23 (2002, No. 3, pp. 288-297; Institute of Fluid Dynamics and Thermodynamics, Otto-von-Guericke University Magdeburg, P.O. Box 4120, D-39016 Magdeburg, Germany.

"Numerical Analysis of Metal Tranfser in Gas Metal Arc Welding," G. Wang, P.G. Huang, and Y.M. Zhang. Departements of Mechanical and Electrical Engineering. University of Kentucky, Dec. 10, 2001.

Desroches, X.; Code-Aster, Note of use for aclculations of welding; Instruction manual U2.03 booklet Thermomechanical; Document: U2.03.05; Oct. 1, 2003.

Eduwelding+, Weld Into the Fugure; Online Welding Seminar—A virtual training environment; 123arc.com; 4 pages, 2005.

Arc Simulation & Certification, Weld Into the Future, 4 pages, 2005.

"Numerical simulation to study the effect of tack welds and root gap on welding deformations and residual stresses of a pipe-flange joint" by M. Abida and M. Siddique, Faculty of Mechanical Engineering, GIK Institute of Engineering Sciences and Technology, Topi, NWFP, Pakistan. Available on-line Aug. 25, 2005.

Abbas, M., et al.; Code_Aster; Introduction to Code_Aster; User Manual; Booket U1.0-: Introduction to Code_Aster; Document: U1.02.00; Version 7.4; Jul. 22, 2005.

16TH International Shop and Offshore Structures Congress: Aug. 20-25, 2006: Southhampton, UK, vol. 2 Specialist Committee V.3 Fabrication Technology Committee Mandate: T Borzecki, G. Bruce, Y.S. Han, M. Heinemann, A Imakita, L. Josefson, W. Nie, D. Olson, F. Roland, and Y. Takeda.

Ratnam and Khalid: "Automatic classification of weld defects using simulated data and an MLP neutral network." Insight vol. 49, No. 3; Mar. 2007.

ChemWeb.com—Journal of Materials Engineering (printed Sep. 26, 2012).

P. Beatriz Garcia-Allende, Jesus Mirapeix, Olga M. Conde, Adolfo Cobo and Jose M. Lopez-Higuera; Defect Detection in Arc-Welding Processes by Means of the Line-to-Continuum Method and Feature Selection; www.mdpi.com/journal/sensors; Sensors 2009, 9, 7753-7770; doi; 10.3390/s91007753.

Production Monitoring 2 brochure, four (4) pages, The Lincoln Electric Company, May 2009.

Training in a virtual environment gives welding students a leg up, retrieved on Apr. 12, 2010 from: http://www.thefabricator.com/article/arcwelding/virtually-welding.

SimWelder, retrieved on Apr. 12, 2010 from: http://www.simwelder.com.

The Lincoln Electric Company; CheckPoint Production Monitoring borchure; four (4) pages; http://www.lincolnelectric.com/assets/en_US/products/literature/s232.pdf; Publication S2.32; Issue Date Feb. 2012.

Bjorn G. Agren; Sensor Integration for Robotic Arc Welding; 1995; vol. 5604C of Dissertations Abstracts International p. 1123; Dissertation Abs Online (Dialog® File 35): © 2012 ProQuest Info& Learning: http://dialogweb.com/cgi/dwclient?req=1331233317524: one (1) page; printed Mar. 8, 2012.

Miller Electric Mgf Co.; MIG Welding System features weld monitoring software; NewsRoom 2010 (Dialog® File 992); © 2011 Dialog. 2010; http://www.dialogweb.com/cgi/dwclient?reg=1331233430487; three (3) pages; printed Mar. 8, 2012.

T. Borzecki, G. Bruce, Ys. Han, et al., Specialist Committee V.3 Fabrication Technology Committee Mandate, Aug. 20-25, 2006, 49 pages, vol. 2, 16th International Ship and Offshore Structures Congress, Southampton, UK.

G. Wang, P.G. Huang, and Y.M. Zhang: " Numerical Analysis of Metal Transfer in Gas Metal Arc Welding": Departments of Mechanical Engineering; and Electrical and Computer Engineering, University of Kentucky, Lexington, Ky 40506- 0108, Dec. 10, 2001, 10 pages.

Chuansong Wu: "Microcomputer-based welder training simulator", Computers in Industry, vol. 20, No. 3, 5 pages, Oct. 1992, pp. 321-325, XP000205597, Elsevier Science Publishers, Amsterdam, NL.

J. Hu, and Hi Tsai, Heat and mass transfer in gas metal arc welding. Part 1: the arc, found in ScienceDirect, International Journal of Heat and Mass transfer 50, 14 pages, 2007, 833-846, Available on Line on Oct. 24, 2006 http://web.mst.edu/~tsai/publications/Hu-IJHMT-2007-1-60.pdf.

Ian Graham, Texture Mapping, Feb. 13, 2003, Carnegie Mellon University Class 15-462 Computer graphics, Lecture 10, 53 pages.

ViziTech USA, retrieved on Mar. 27, 2014 from http://vizitechusa.com/, 2 pages.

Guu and Rokhlin ,Technique for Simultaneous Real-Time Measurements of Weld Pool Surface Geometry and Arc Force, 10 pages, Dec. 1992.

D. Mavrikios, V. Karabatsou, D. Fragos and G. Chryssolouris, A prototype virtual reality-based demonstrator for immersive and interactive simulation of welding processes, International Journal of Computer Integrated Manufacturing, abstract, 1 page, Apr.-May 2006, 294-300, vol. 19, no. 3, http://eds.A.ebscohost.com/eds/pdfviewer/pdfviewer?vid=2&sid=ab8fe67b-1 f7.

S.B. Chen, L. Wu, Q. L. Wang and Y. C. Liu, Self-Learning Fuzzy Neural Networks and Computer Vision for Control of Pulsed GTAW, 9 pages, dated May 1997.

Patrick Rodjito, Position tracking and motion prediction using Fuzzy Logic, 81 pages, 2006, Colby College.

D'Huart, Deat, and Lium; Virtual Environment for Training, 6th International Conference, ITS 20002, 6 pages, Jun. 2002.

Konstantinos Nasios (Bsc), Improving Chemical Plant Safety Training Using Virtual Reality, Thesis submitted to the University of Nottingham for the Degree of Doctor of Philosophy, 313 pages, Dec. 2001.

Nancy C. Porter, J. Allan Cote, Timothy D. Gifford, and Wim Lam, Virtual Reality Welder Training, 29 pages, dated Jul. 14, 2006.

J.Y. (Yosh) Mantinband, Hillel Goldenberg, Llan Kleinberger, Paul Kleinberger, Autosteroscopic, field-sequential display with full freedom of movement OR Let the display were the shutter-glasses, 3ality (Israel) Ltd., 8 pages, 2002.

Steve Mann, Raymond Chun Bing Lo, Kalin 0vtcarov, Shixiang Gu, David Dai, Calvin Ngan,Tao Ai, Realtime HDR(High Dynamic Range)Video for Eyetap Wearable Computers, FPGA-Based Seeing Aids, and Glasseyes (Eyetaps), 2012 25th IEEE Canadian Conference on Electrical and Computer Engineering (CCECE), pp. 1-6, 6 pages, Apr. 29, 2012.

Kyt Dotson, Augmented Reality Welding Helmet Prototypes How Awsome the Technology Can Get, Sep. 26, 2012, Retrieved from the Internet: URL:http://siliconangle.com/blog/2012/09/26/augmented-reality-welding-helmetprototypes-how-awesome-the-technology-can-get/,1 page, retrieved on Sep. 26, 2014.

Terrence O'Brien, "Google's Project Glass gets some more details", Jun. 27, 2012, Retrieved from the Internet: http://www.engadget.com/2012/06/27/googles-project-glass-gets-some-more-details/, 1 page, retrieved on Sep. 26, 2014.

Yao, et al., 'Development of a Robot System for Pipe Welding'. 2010 International Conference on Measuring echnology and Mechatronics Automation. Retrieved from the Internet: http://ieeexplore.ieee.org/stamp/stamp.jsp? tp=&arnumber=5460347&tag=1; pp. 1109-1112, 4 pages, 2010.

Anansi/A WS D 10.11 MID 10.11 :2007 Guide for Root Pass Welding of Pipe without Backing Edition: 3rd American Welding Society / Oct. 13, 2006/36 pages ISBN: 0871716445, 6 pages.

M. Jonsson, L. Karlsson, and L-E Lindgren, Simulation of Tack Welding Procedures in Butt Joint Welding of Plates Welding Research Supplement, 7 pages, Oct. 1985.

Balijepalli, A. and Kesavadas, Haptic Interfaces for Virtual Environment and Teleoperator Systems, Haptics 2003, 7-.,Department of Mechanical & Aerospace Engineering, State University of New York at Buffalo, Ny, 7 pages, 2003.

Johannes Hirche, Alexander Ehlert, Stefan Guthe, Michael Doggett, Hardware Accelerated Per-Pixel Displacement Mapping, 8 pages.

William T. Reeves, "Particles Systems—A Technique for Modeling a Class of Fuzzy Objects", Computer Graphics 17:3 pp. 359-376, 17 pages, 1983.

* cited by examiner

VIRTUAL WELDING SYSTEM

CROSS-REFERENCE TO RELATED APPLICATIONS

The present application is a continuation-in-part of U.S. patent application Ser. No. 12/501,257, filed on Jul. 10, 2009.

BACKGROUND

1. Technical Field

The present disclosure is related to virtual reality simulation and, more particularly, to systems and methods for providing arc welding training in a simulated virtual reality environment or augmented reality environment.

2. Discussion of Art

Learning how to arc weld traditionally takes many hours of instruction, training, and practice. There are many different types of arc welding and arc welding processes that can be learned. Typically, welding is learned by a student using a real welding system and performing welding operations on real metal pieces. Such real-world training can tie up scarce welding resources and use up limited welding materials. Recently, however, the idea of training using welding simulations has become more popular. Some welding simulations are implemented via personal computers and/or on-line via the Internet. Current known welding simulations, however, tend to be limited in their training focus.

For example, some welding simulations focus on training only for "muscle memory", which simply trains a welding student how to hold and position a welding tool. Other welding simulations focus on showing visual and audio effects of the welding process, but only in a limited and often unrealistic manner which does not provide the student with the desired feedback that is highly representative of real world welding. It is this actual feedback that directs the student to make necessary adjustments to make a good weld. Welding is learned by watching the arc and/or puddle, not solely by muscle memory.

Further limitations and disadvantages of conventional, traditional, and previously proposed approaches will become apparent to one of skill in the art, through comparison of such approaches with embodiments of the present invention as set forth in the remainder of the present application with reference to the drawings.

BRIEF DESCRIPTION

In one aspect of the invention, a virtual welding system includes a programmable processor based subsystem and a spatial tracker operatively connected to the programmable processor based subsystem. A mock welding tool is employed, which is capable of being spatially tracked by the spatial tracker. The mock welding tool includes one or more adapters, wherein each adapter emulates the real-world appearance of a particular weld type. A base is removably coupled to each of the one or more adapters.

In another aspect of the invention, a mock welding tool is used within a virtual welding system. One or more adapters are employed, wherein each adapter emulates the physical characteristics of a particular weld type. A base is removably coupled to each of the one or more adapters, the base identifies a real time spatial location of the mock welding tool relative to a datum location.

Further, a method is employed to use a mock welding tool within a virtual welding system. A first adapter is removably connected to a base, the first adapter being associated with a first weld type. The first adapter is removed from the base wherein a second adapter is removably connected to the base, the second adapter being associated with a second weld type. The use of a plurality of adapter types with a common base facilitates use of a portable virtual welding system that can be employed in substantially any mobile location.

This brief description is provided to introduce a selection of concepts in a simplified form that are further described herein. This brief description is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

Figure 1:
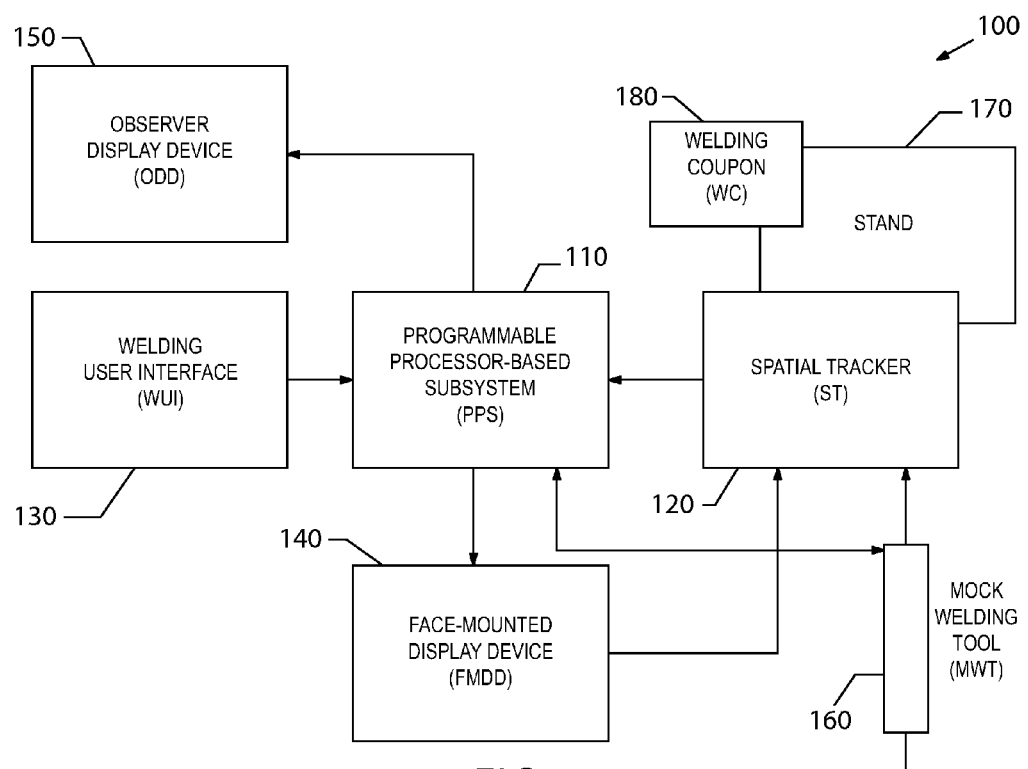
FIG. 1 is a block diagram of a virtual welding system that includes an interchangeable mock welding tool with a base that can connect to each of a plurality of adapters.

Referring now to the figures, several embodiments or implementations of the present invention are hereinafter described in conjunction with the drawings, wherein like reference numerals are used to refer to like elements throughout. The present embodiments are directed to a virtual welding system that employs a mock welding tool that has a base to accommodate a plurality of adapters, wherein each adapter simulates a different weld type. The adapters can be have a common size to allow seamless removable coupling with the base when desired. Although illustrated and described hereinafter in the context of various exemplary virtual welding systems, the invention is not limited to the illustrated examples.

More particularly, the subject embodiments relate to a virtual reality welding system that includes a programmable processor-based subsystem, a spatial tracker operatively connected to the programmable processor-based subsystem, at least one mock welding tool capable of being spatially tracked by the spatial tracker, and at least one display device operatively connected to the programmable processor-based subsystem. To provide additional flexibility, the mock welding tool includes a base and a plurality of adapters, wherein each adapter is used to simulate a different welding type. For example, a first adapter can simulate GMAW welding, a second adapter can simulate SMAW welding, a third adapter can simulate oxyfuel welding, and so on. Alternatively or in addition, the tools can be used to simulate a cutting device, such as an oxyfuel or other cutting torch. The adapters can all have a standardized size to allow seamless switching as they are removed and connected to a common base. In order to accommodate portable use, a compactable stand is employed to hold a welding coupon in space for use with the mock welding tool. In this manner, the system is capable of simulating a plurality of weld types in virtual reality space, wherein a weld puddle has real-time molten metal fluidity and heat dissipation characteristics that are commensurate with each weld type.

The real-time molten metal fluidity and heat dissipation characteristics of the simulated weld puddle provide real-time visual feedback to a user of the mock welding tool when displayed, allowing the user to adjust or maintain a welding technique in real-time in response to the real-time visual feedback. The displayed weld puddle is representative of a weld puddle that would be formed in the real-world based on the user's welding technique and the selected welding process and parameters. By viewing a puddle (e.g., shape, color, slag, size), a user can modify his technique to make a good weld and determine the type of welding being done. The shape of the puddle is responsive to the movement of the mock welding tool. As used herein, the term "real-time" means perceiving and experiencing in time in a simulated environment in the same way that a user would perceive and experience in a real-world welding scenario. Furthermore, the weld puddle is responsive to the effects of the physical environment including gravity, allowing a user to realistically practice welding in various positions including horizontal, vertical, and overhead welding and various pipe welding angles.

Referring now to the drawings wherein the showings are for the purpose of illustrating the exemplary embodiments, FIG. 1 is a block diagram of a virtual welding system 100 that provides arc welding training in a real-time virtual reality environment. The virtual welding system 100 includes a programmable processor-based subsystem (PPS) 110. The virtual welding system 100 further includes a spatial tracker (ST) 120 operatively connected to the PPS 110. The virtual welding system 100 also includes a physical welding user interface (WUI) 130 operatively connected to the PPS 110 and a face-mounted display device (FMDD) 140 operatively connected to the PPS 110 and the ST 120. The virtual welding system 100 further includes an observer display device (ODD) 150 operatively connected to the PPS 110. The virtual welding system 100 also includes at least one mock welding tool (MWT) 160 operatively connected to the ST 120 and the PPS 110. The virtual welding system 100 further includes a stand 170 and at least one welding coupon (WC) 180 capable of being attached to the stand 170. The MWT 160 can include a base (not shown) that couples to one or more adapters (not shown) to simulate a plurality of different weld types.

Figure 2:
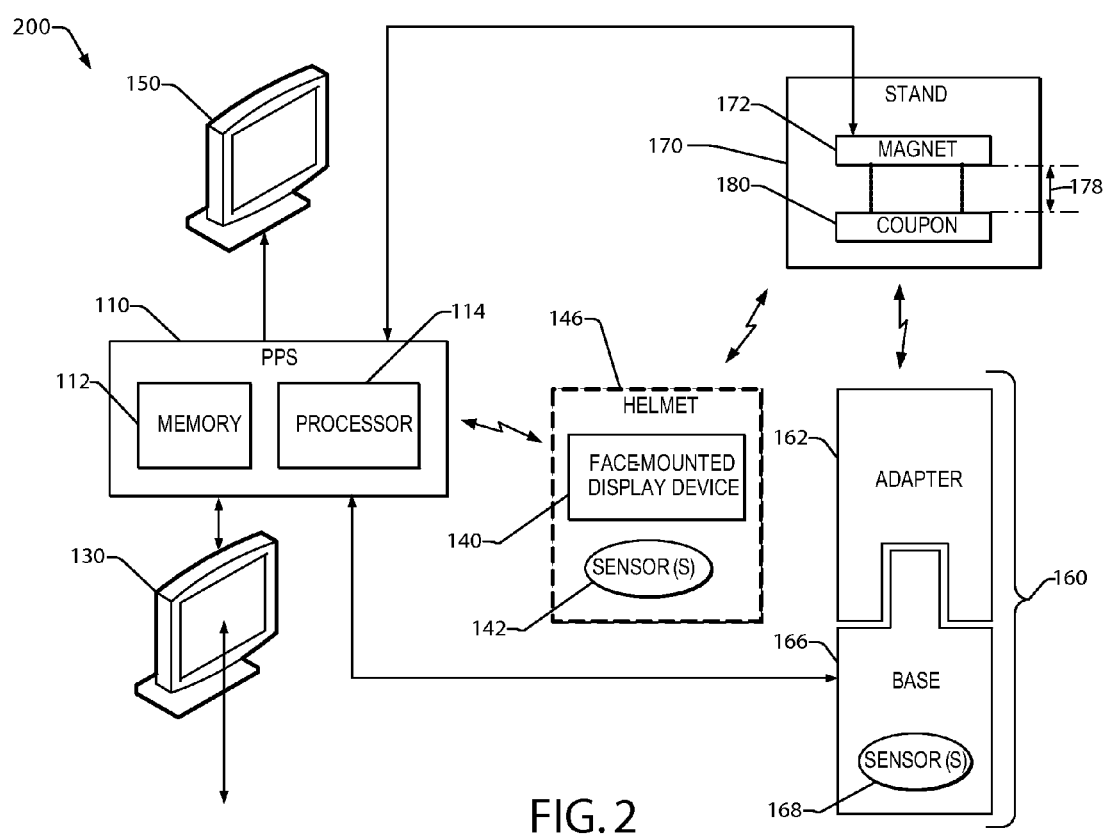
FIG. 2 is one implementation of the system set forth in FIG. 1.

FIG. 2 illustrates a system 200 that illustrates one implementation of the system set forth in FIG. 1. The FMDD 140 is used to display a simulated virtual environment for a user to visually experience welding. In order to provide an accurate rendering of this simulated environment, the FMDD 140 is communication with the PPS 110 to receive and transmit data relative to the spatial location of the FMDD 140 in the system 200. Communication can be facilitated utilizing known hardwire and/or wireless technologies including Bluetooth, wireless Ethernet and the like. To acquire spatial location data, one or more sensors 142 are disposed within and/or proximate to FMDD 140. The sensors 142, in turn, evaluate spatial location relative to a particular datum within the system 200, such as a magnet 172. The magnet 172 can be located at a known datum point and disposed a predetermined distance 178 relative to the welding coupon 180. This predetermined distance 178 can be maintained by utilizing a form factor, template, or preconfigured structure in association with the stand 170. Thus, movement of the sensors 142 relative to the magnet 172 can inherently provide location data of the FMDD 140 relative to the welding coupon 180 within the stand 170. The sensors 142 can communicate wirelessly to identify location relative to the magnet utilizing known communication protocols to update the FMDD 140 in real-time to coincide with the user's motion.

The system 200 also includes the MWT 160, which includes an adapter 162 that is coupled to a base 166. It is to be appreciated that the adapter 162 is merely representative of one of a plurality of adapters that each simulate a particular weld type. The adapter 162 is removably coupled to the base 166 to allow removal and replacement of one adapter as a substitute for another. Removable coupling can be accomplished utilizing tabs, dimples, sliders, push buttons, etc. to allow a user to depress, twist, or otherwise mechanically modify the adapter 162 and/or the base 166. In order to accurately simulate the particular weld type, each adapter 162 is sized to represent a real world equivalent that would be used to perform actual weld operations. Once a particular adapter is coupled to the base, the user can input the type of adapter in use, to allow the PPS to load and execute an appropriate instruction set associated therewith. In this manner, an accurate rendering is displayed on the FMDD 140 that is commensurate with each adapter type.

One or more sensors 168 can be disposed within or proximate to the base 166. As with the FMDD 140, the sensors 168 can wirelessly determine spatial location relative to the magnet 172 on the stand 170. In this manner, the adapter 162 and base 166, in combination, inherently have a known location and space relative to the magnet 172 as the dimensions of both the adapter 162 and the base 166 are predetermined. In order to insure that the system 200 is calibrated properly to accommodate each adapter 162, a user may interface with the PPS 110 (e.g. via the WUI 130) to indicate that a particular adapter is currently in use. Once such an indication is made, the PPS 110 can retrieve a lookup table from the memory 112, which contains a rule set to properly render a simulated environment as experienced by the user through the FMDD 140.

In an embodiment, the PPS 110 is a computer operable to execute the disclosed architecture. In order to provide additional context for various aspects of the present invention, the following discussion is intended to provide a brief, general description of a suitable computing environment in which the various aspects of the present invention may be implemented. The PPS 110 can employ computer-executable instructions that may run on one or more computers, implemented in combination with other program modules, and/or as a combination of hardware and software. Generally, program modules include routines, programs, components, data structures, etc., that perform particular tasks or implement particular abstract data types. For example, such programs and computer-executable instructions can be processed via a robot using various machine control paradigms.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

The PPS 110 can utilize an exemplary environment for implementing various aspects of the invention including a computer, wherein the computer includes a processor 114, a memory 112 and a system bus for communication purposes. The system bus couples system components including, but not limited to the memory 112 to the processor 114. The processor 114 may be any of various commercially available processors. Dual microprocessors and other multi-processor architectures also can be employed as the processor 114.

The system bus can be any of several types of bus structure including a memory bus or memory controller, a peripheral bus and a local bus using any of a variety of commercially available bus architectures. The memory 112 can include read only memory (ROM) and random access memory (RAM). A basic input/output system (BIOS), containing the basic routines that help to transfer information between elements within the PPS 110, such as during start-up, is stored in the ROM.

The PPS 110 can further include a hard disk drive, a magnetic disk drive, e.g., to read from or write to a removable disk, and an optical disk drive, e.g., for reading a CD-ROM disk or to read from or write to other optical media. The PPS 110 can include at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the PPS 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM, including an operating system, one or more application programs, other program modules, and program data. The operating system in the PPS 110 can be any of a number of commercially available operating systems.

In addition, a user may enter commands and information into the computer through a keyboard and a pointing device, such as a mouse. Other input devices may include a microphone, an IR remote control, a track ball, a pen input device, a joystick, a game pad, a digitizing tablet, a satellite dish, a scanner, or the like. These and other input devices are often connected to the processor through a serial port interface that is coupled to the system bus, but may be connected by other interfaces, such as a parallel port, a game port, a universal serial bus ("USB"), an IR interface, and/or various wireless technologies. A monitor (not shown) or other type of display device, may also be connected to the system bus via an interface, such as a video adapter. Visual output may also be accomplished through a remote display network protocol such as Remote Desktop Protocol, VNC, X-Window System, etc. In addition to visual output, a computer typically includes other peripheral output devices, such as speakers, printers, etc.

A display, such as the ODD 150 and the WUI 130, can be employed with the PPS 110 to present data that is electronically received from the processor. For example, the display can be an LCD, plasma, CRT, etc. monitor that presents data electronically. Alternatively or in addition, the display can present received data in a hard copy format such as a printer, facsimile, plotter etc. The display can present data in any color and can receive data from the PPS 110 via any wireless or hard wire protocol and/or standard. In an embodiment, the WUI 130 is a touch-screen that allows a user to interface with the PPS 110 such as reviewing weld data from one or more previous simulations. A user can also navigate through various data paradigms to identify information relevant to a particular analysis (e.g., weld quality), wherein such data is evaluated against one or more benchmarks for scoring or other comparison.

The computer can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

Figure 3:
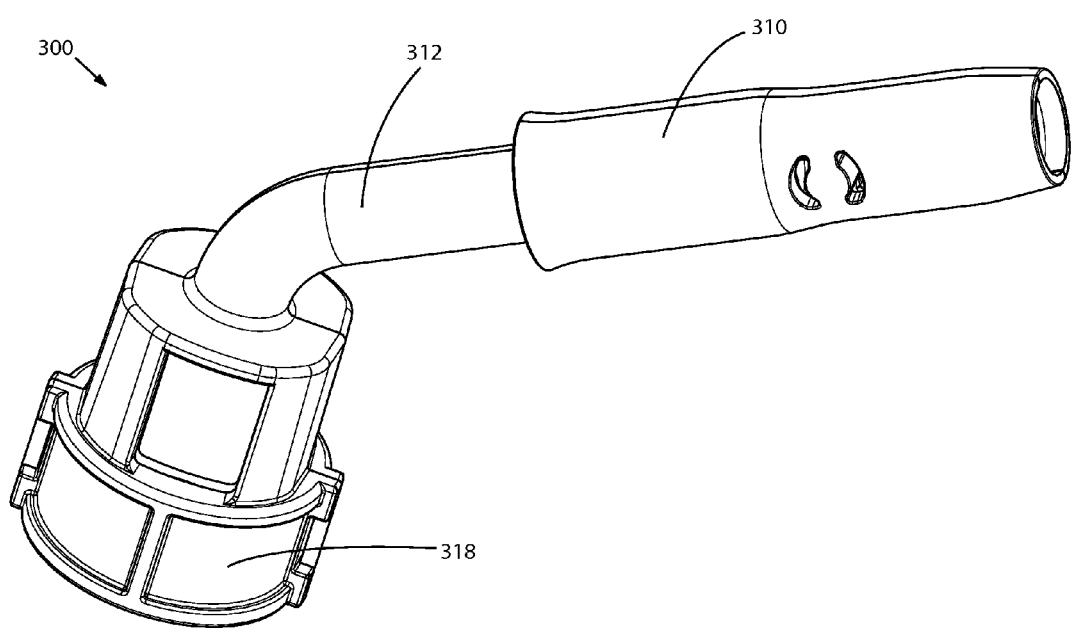
FIG. 3 is an exemplary side plan view of a GMAW adapter that removably couples to a base.
Figure 4:
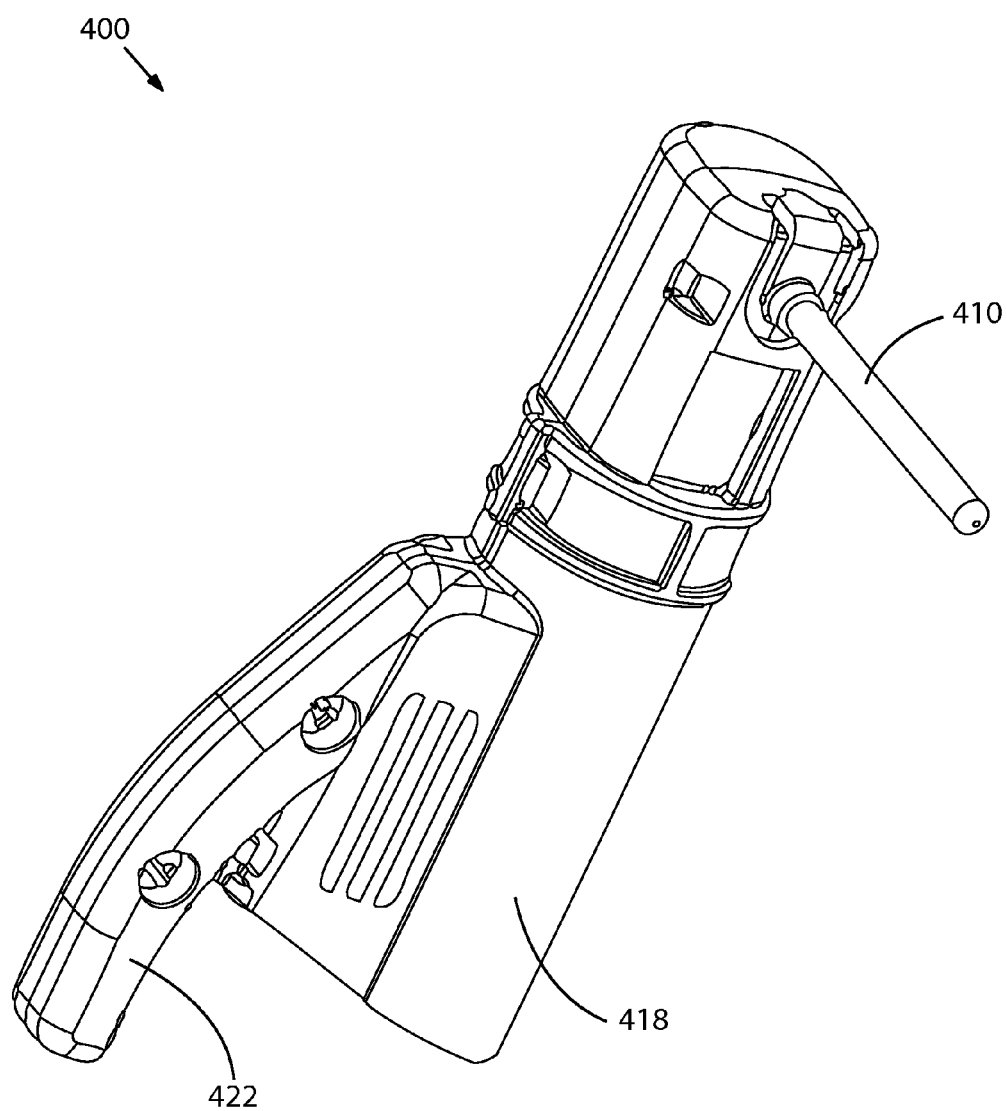
FIG. 4 is an exemplary perspective view of a stick tool adapter that removably couples to a base.
Figure 5:
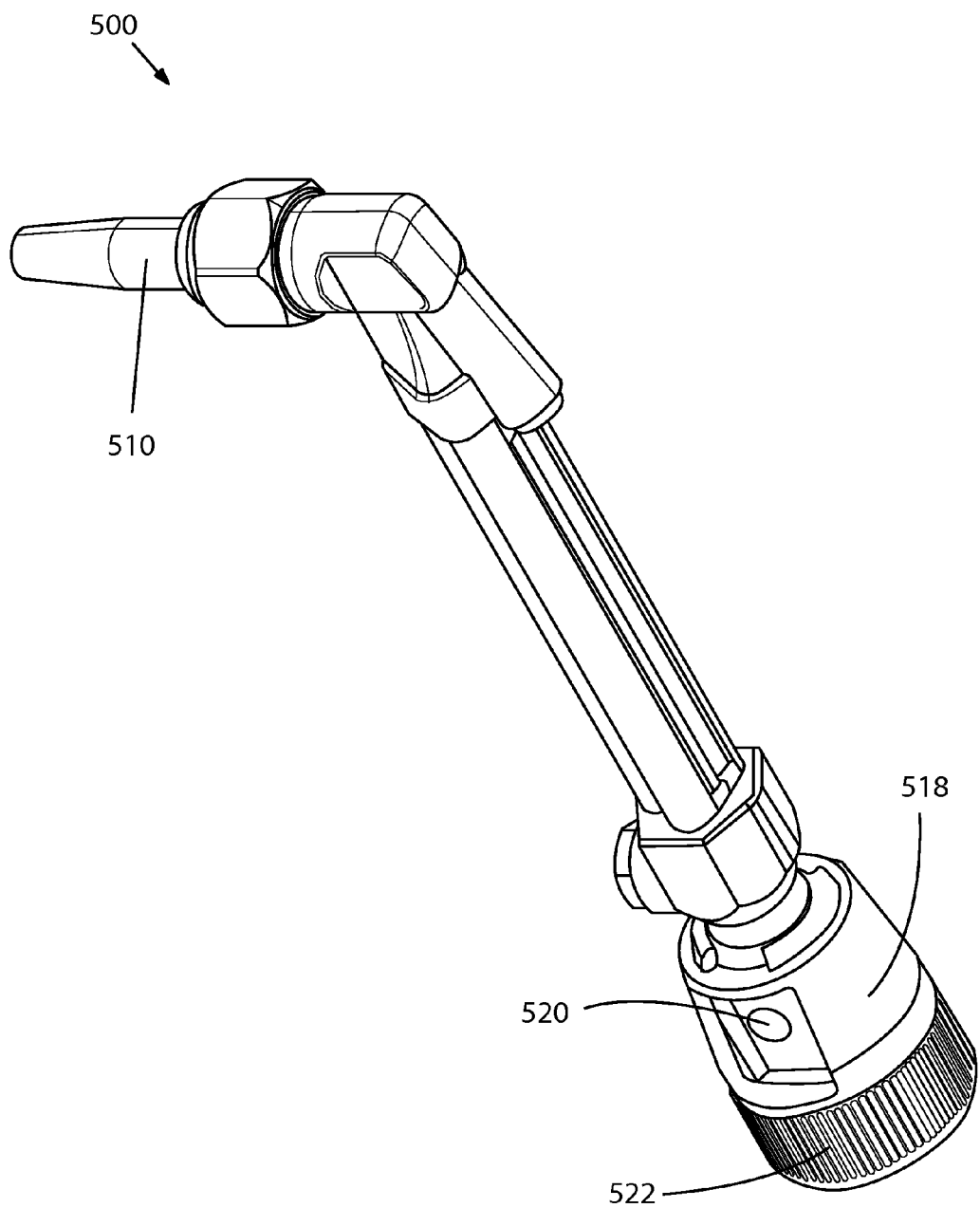
FIG. 5 is an exemplary perspective view of an oxyfuel adapter that removably couples to a base.

FIGS. 3-5 illustrate non-limiting example embodiments of the adapter 162, wherein FIG. 3 shows the adapter 162 as a GMAW welding gun 300; FIG. 4 shows the adapter 162 as a stick welding tool 400; and FIG. 5 shows the adapter 162 as an oxyfuel torch 500. Although, the adapters are described herein as having a plurality of different components, it is to be appreciated that both unitary and multi-component embodiments of the adapter are contemplated within the scope of this invention. Turning first to FIG. 3, the GMAW welding gun 300 includes a nozzle 310 connected to an interface 318 via a tube 312. The welding gun 300 can have substantially the same weight and dimension as a GMAW gun as used in real-world applications. The dimension of each component within the gun 300 can be a known value, which can be used to calibrate the gun in view of the welding coupon 180 and magnet 172. The interface 318 can include one or more mechanical features to allow removable coupling of the adapter 300 to a base.

FIG. 4 illustrates the stick welding tool 400 for plate and pipe welding and includes a holder 422 and a simulated stick electrode 410. In an embodiment, the simulated stick electrode 410 can include a tactilely resistive tip to simulate resistive feedback that occurs during, for example, a root pass welding procedure in real-world pipe welding or when welding a plate. If the user moves the simulated stick electrode 162 too far back out of the root, the user will be able to feel or sense the lower resistance, thereby deriving feedback for use in adjusting or maintaining the current welding process. An interface 418 allows removable coupling of the stick welding tool 400 to a base.

FIG. 5 illustrates the oxyfuel adapter 500 that includes a nozzle 510 and an interface 518 that allows removable coupling of the oxyfuel adapter 500 to a base. In this embodiment, the interface 518 includes a collar 522 that can be secured around the diameter of the base. A push button 520 can include a protrusion or other feature to mechanically interface with a complimentary feature (e.g., dimple) on the base. In this manner, the adapter 500 can "lock" to the base dependent upon whether the push button is depressed or otherwise manipulated. In other embodiments, the oxyfuel adapter can be used to represent and cutting torch that is used to cut metal objects. In this embodiment, the cutting torch is displayed within the virtual weld system as it would operate in a real-world application. For example, the PPS 110 can load and execute code that is representative of a cutting torch application instead of a welding torch.

Other mock welding tools are possible as well, in accordance with other embodiments of the present invention, including a MWT that simulates a hand-held semi-automatic welding gun having a wire electrode fed through the gun, for example. Furthermore, in accordance with other certain embodiments of the present invention, a real welding tool could be used as the MWT 160 to better simulate the actual feel of the tool in the user's hands, even though, in the virtual welding system 100, the tool would not be used to actually create a real arc. Also, a simulated grinding tool may be provided, for use in a simulated grinding mode of the virtual welding system 100. Similarly, a simulated cutting tool may be provided, for use in a simulated cutting mode of the virtual welding system 100. Furthermore, a simulated gas tungsten arc welding (GTAW) torch or filler material may be provided for use in the virtual welding system 100.

Figure 6:
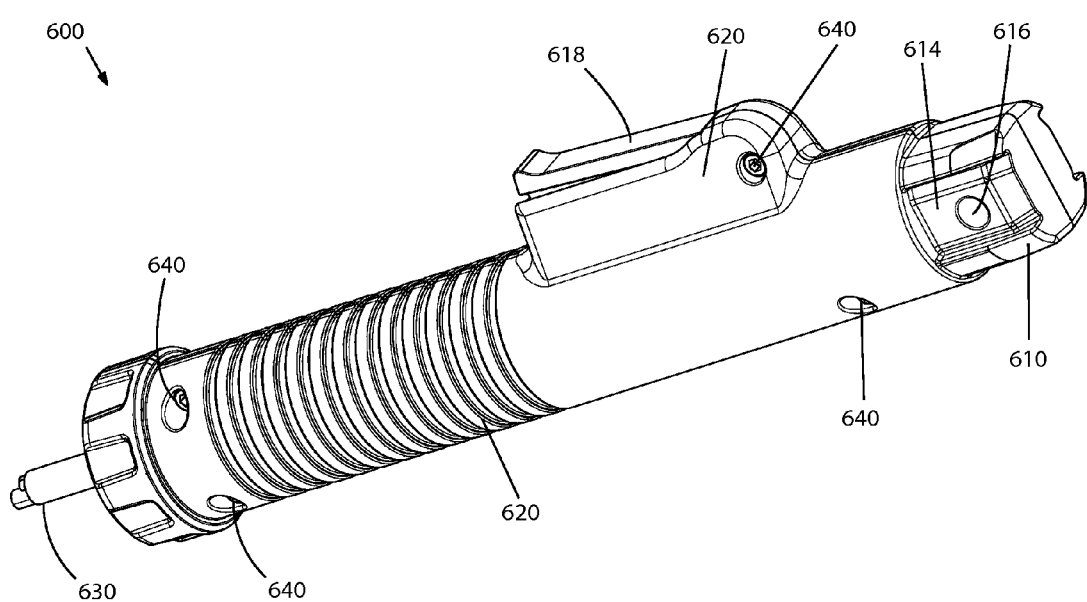
FIG. 6 is a perspective view of a base that can interface with the adapters set forth in FIGS. 3, 4 and 5.

FIG. 6 illustrates a base 600 that is employed to interface to one or more adapters such as the GMAW gun 300, the stick-welding tool 400, and the oxyfuel adapter 500. The base 600 includes a body 620, which can house one or more electronic components, such as the sensors 168 described herein. In an embodiment, the body 620 is comprised of two halves that are held together via fasteners 640 such as, for example, screws, bolts, rivets, etc. A hard-wire cable 630 extends from the body 620 to facilitate communication of the base 600 with the PPS 110.

The interface 610 includes a landing 614 and a dimple 616 disposed therein on opposite sides of the interface 610. The landing and dimple combination can serve as a removable interlock for a complimentary component within the interface of the exemplary adapters 300, 400, 500. Substantially any mechanical interface, however, is contemplated to facilitate efficient removal and replacement of an adapter to the base 600. A push button 618 disposed within a protrusion 636 can be employed to indicate that a user is in an active welding mode when the push button 618 is depressed. With at least reference to the adapter 400, a complimentary form factor can be included in the adapter to fit as a sleeve over the push button 618 wherein the user can depress the push button via a form factor feature on the adapter. For this purpose, the adapter form factor can simulate a real world trigger or a similar device to give the user a real world look and feel for weld operation.

Figure 7:
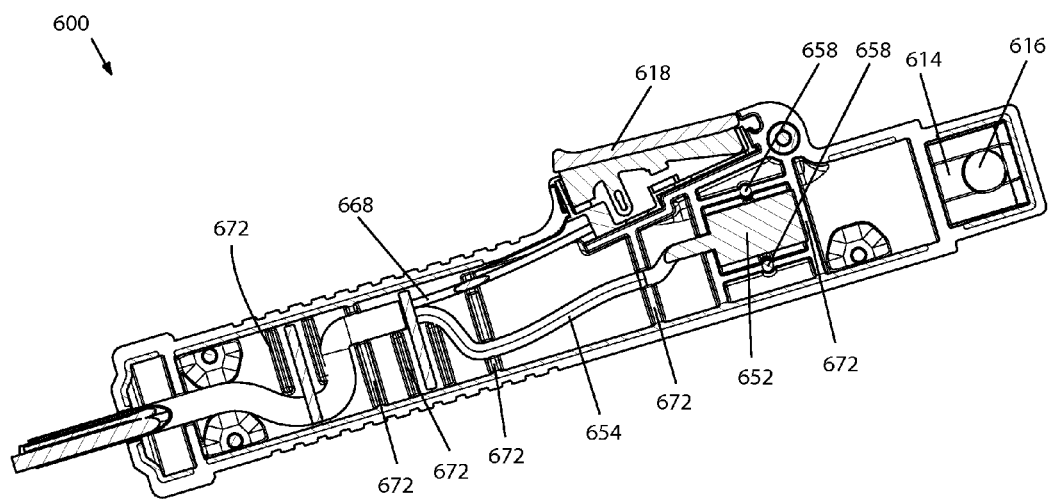
FIG. 7 is a cut-away perspective view of the base depicted in FIG. 6.
Figure 8A:
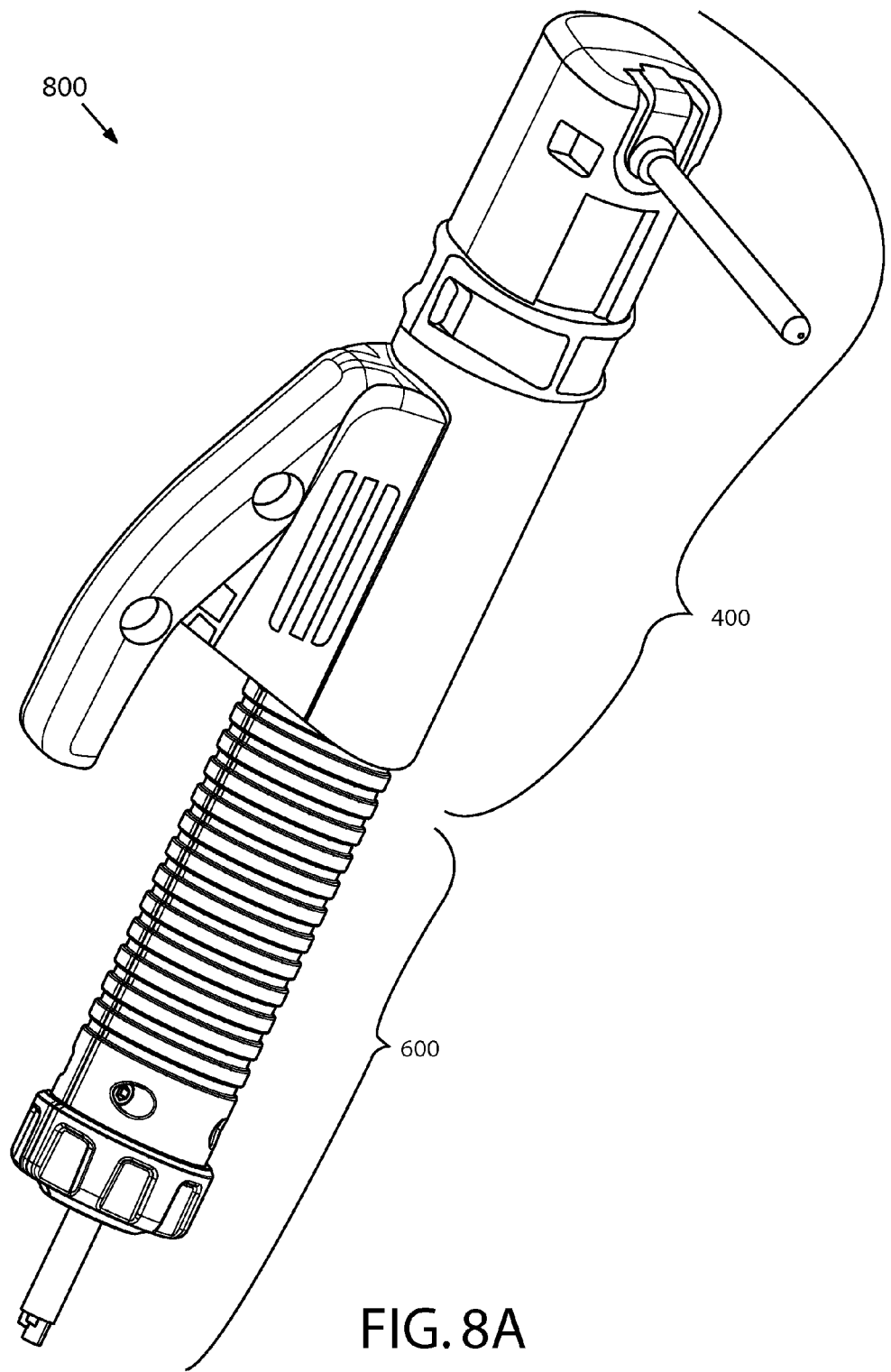
FIG. 8A is a perspective view of an assembled mock welding tool that includes the base and a stick tool adapter.
Figure 8B:
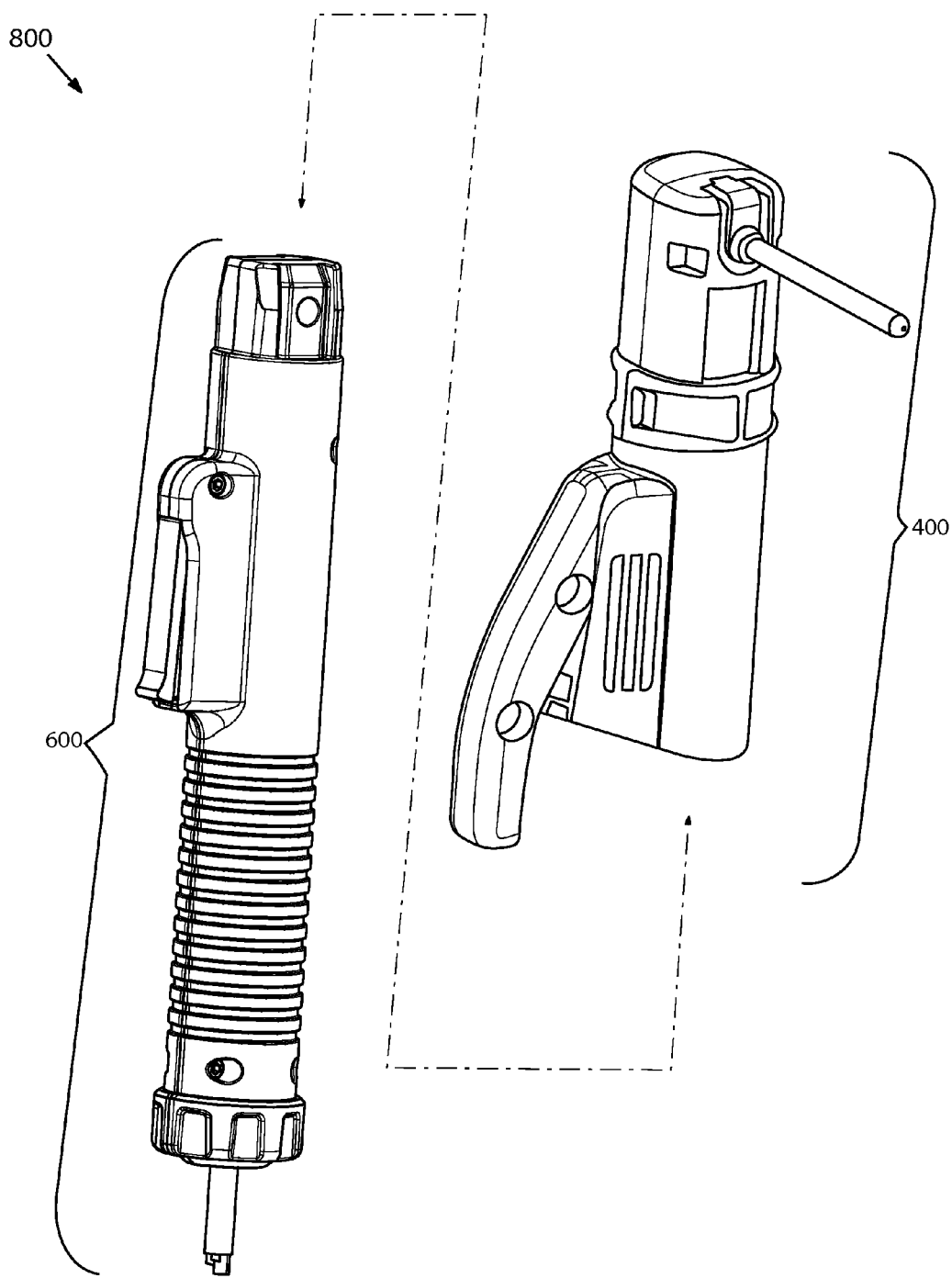
FIG. 8B is a perspective view of an exploded mock welding tool that includes the base and a stick tool adapter.

FIG. 7 is a cut-away perspective view of the base 600 to reveal a sensor 652 disposed therein. The sensor 652 communicates with one or more different components (e.g., PPS 110) via a cable 654 and is disposed within the base 600 in a pre-determined location and held in place via fasteners 658. Vanes 672 provides structural support for the base 600 throughout the body 620. In an embodiment, the sensor 652 utilizes known non-contact technology such as capacitance sensors, piezoelectric, eddy current, inductive, ultrasonic, Hall effect, and/or infrared proximity sensor technologies. Such technologies can be used with other sensors described herein including sensors 142 and 168 used in the helmet 146 and base 166 respectively. FIG. 8 illustrates a mock welding tool 800 wherein the adapter 400 is removably coupled to the base 600 for use within the virtual welding system 100.

Figure 9:
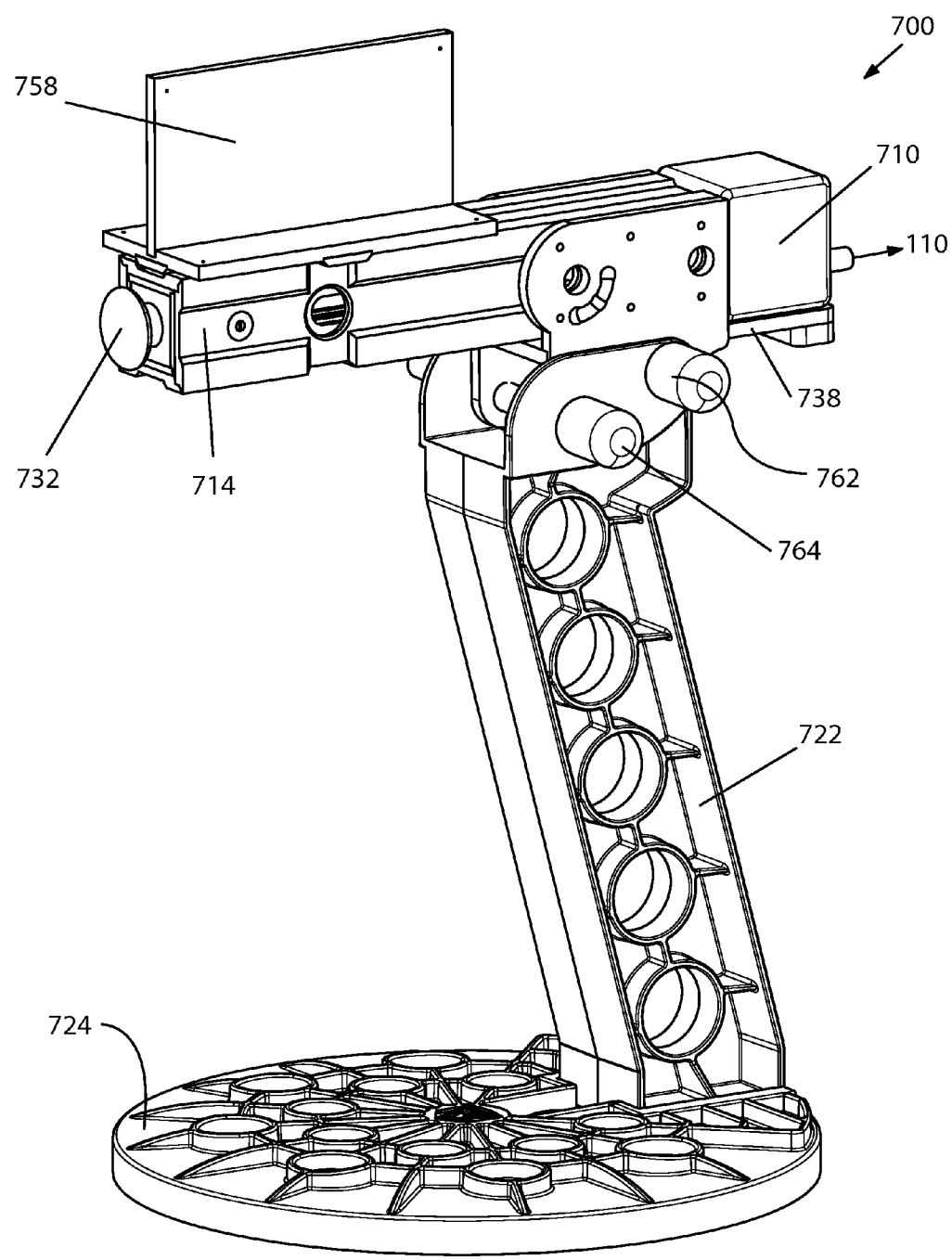
FIG. 9 is a perspective view of a stand utilized to hold a welding coupon and magnet in known spatial locations.

FIG. 9 illustrates a stand 700 that is utilized to locate a welding coupon 758 in space at a known location relative to a magnet 710. The stand 700 includes an arm 714 and a base 724 which are coupled together via an upright 722. In an embodiment, the upright 722 is removably engaged to the base 724 to allow the stand 700 to be broken down into individual components for packaging and shipping. In addition, the base 724 and upright 722 can have one or more structural features (e.g., vanes) that add structural support to such components that at the same time maintain a relatively low weight. A plunger 732 can be drawn away from the arm 714 to allow the removal and replacement of coupons onto the stand 700 in a repeatable spatial location.

Figure 10:
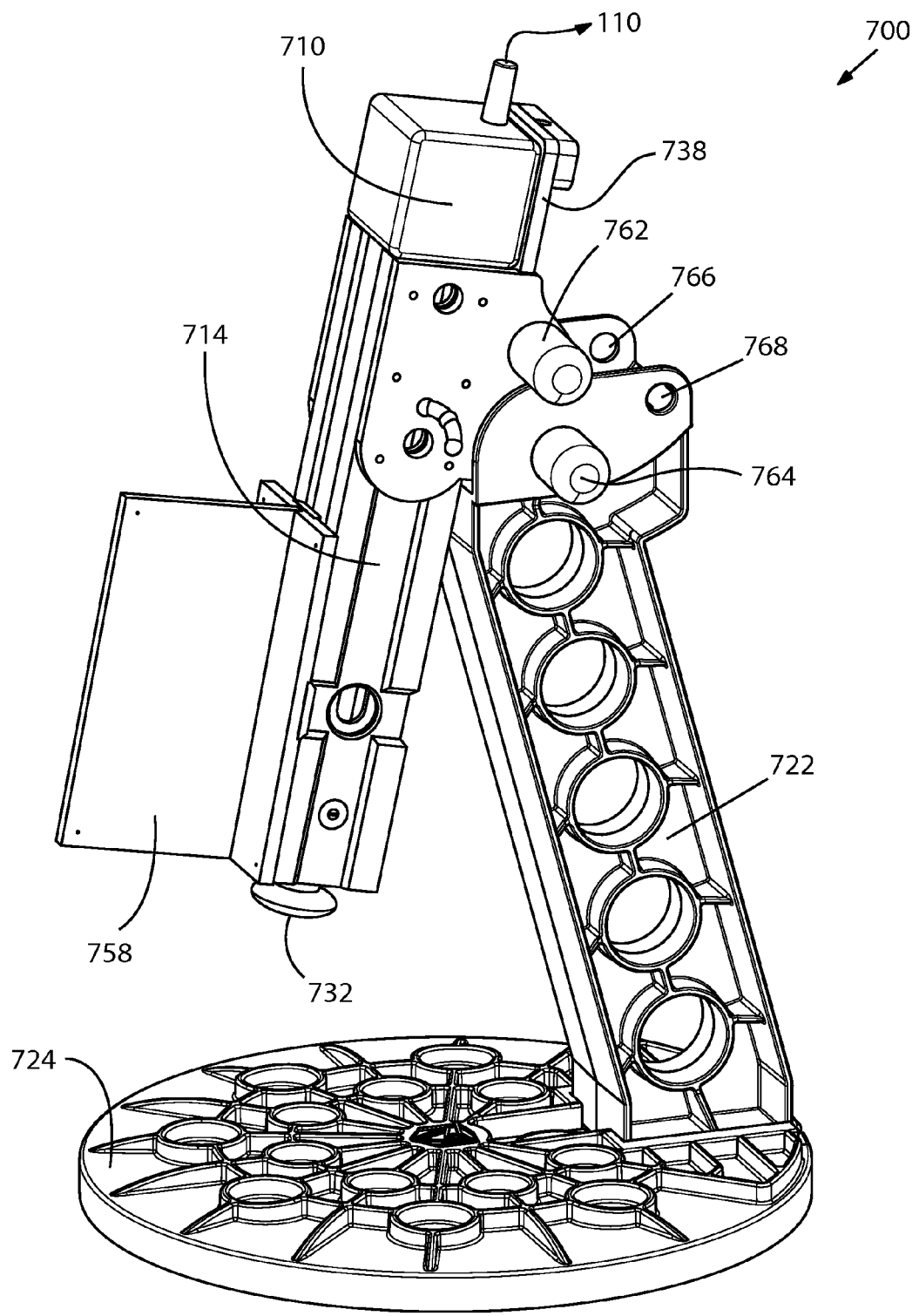
FIG. 10 is a perspective view illustrating the stand of FIG. 9 in an alternate, compactable position to hold the welding coupon and magnet in known spatial locations.

The dimensions of the arm 714 and the location of the welding coupon 758 relative to a magnet 710 disposed on a landing 738 are all known, a mock welding tool proximate to the welding coupon 758 will have a known and repeatable output thereby providing an appropriate real-time virtual welding environment to the user. Pins 762, 764 can be removed from the stand 700 to allow the arm 714 to pivot around the pin 764 as depicted in FIG. 10. In this embodiment, the pin 762 is removed from hole 766, 768 thereby allowing the arm 714 to rotate around the pin 764 to a second location. In this manner, a user can simulate welds in a multiple number of planes (e.g., horizontal and vertical) to learn the nuances associated with each. It is worth noting that the design of the stand 700 insures that the spatial location of the magnet 710 relative to the welding coupon 758 is maintained in either position to provide accurate and repeatable results for creation and display of the real-time welding environment simulation.

Figure 11:
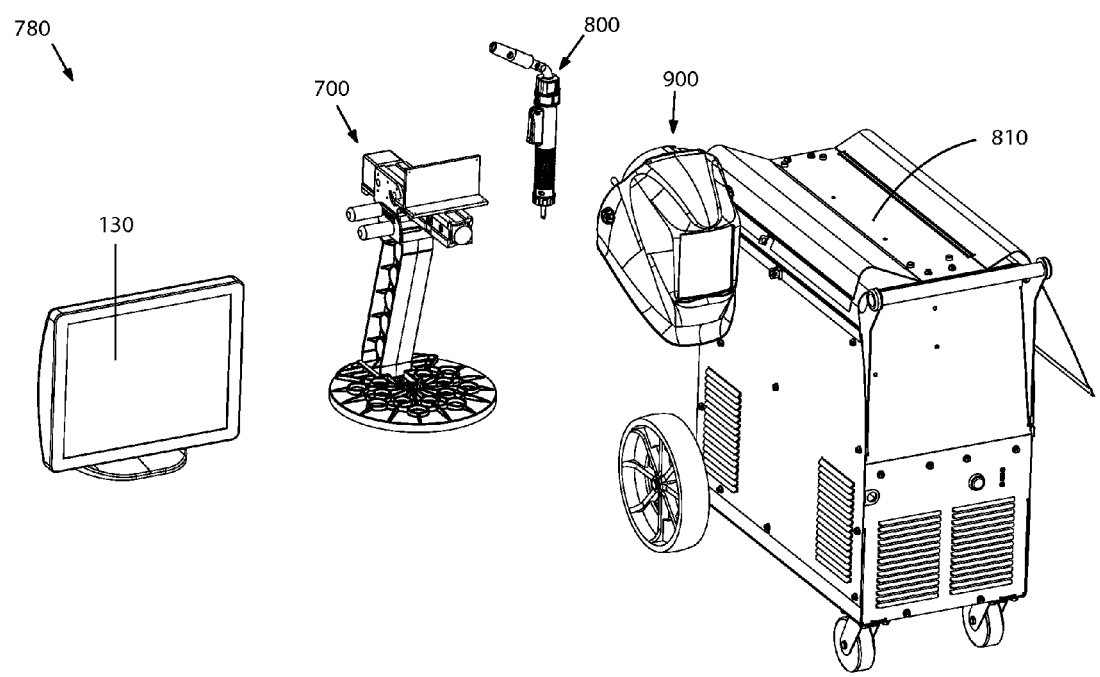
FIG. 11 is an assembly view illustrating a kit that includes components to transport and operate a mobile virtual welding system.

FIG. 11 illustrates a portable welding kit that can be easily transported from location to location. The kit can be set up in substantially any location proximate to a power source, which may include a battery, A/C, or other power. A container 810 can be substantially shaped as a welding machine housing wherein the interior includes a plurality of shells, platforms and other storage areas to accommodate the WUI 130, the stand 700, the mock welding tool 800, and a helmet 900. The container can further include wheels to facilitate efficient transport of the container 810.

Figure 12:
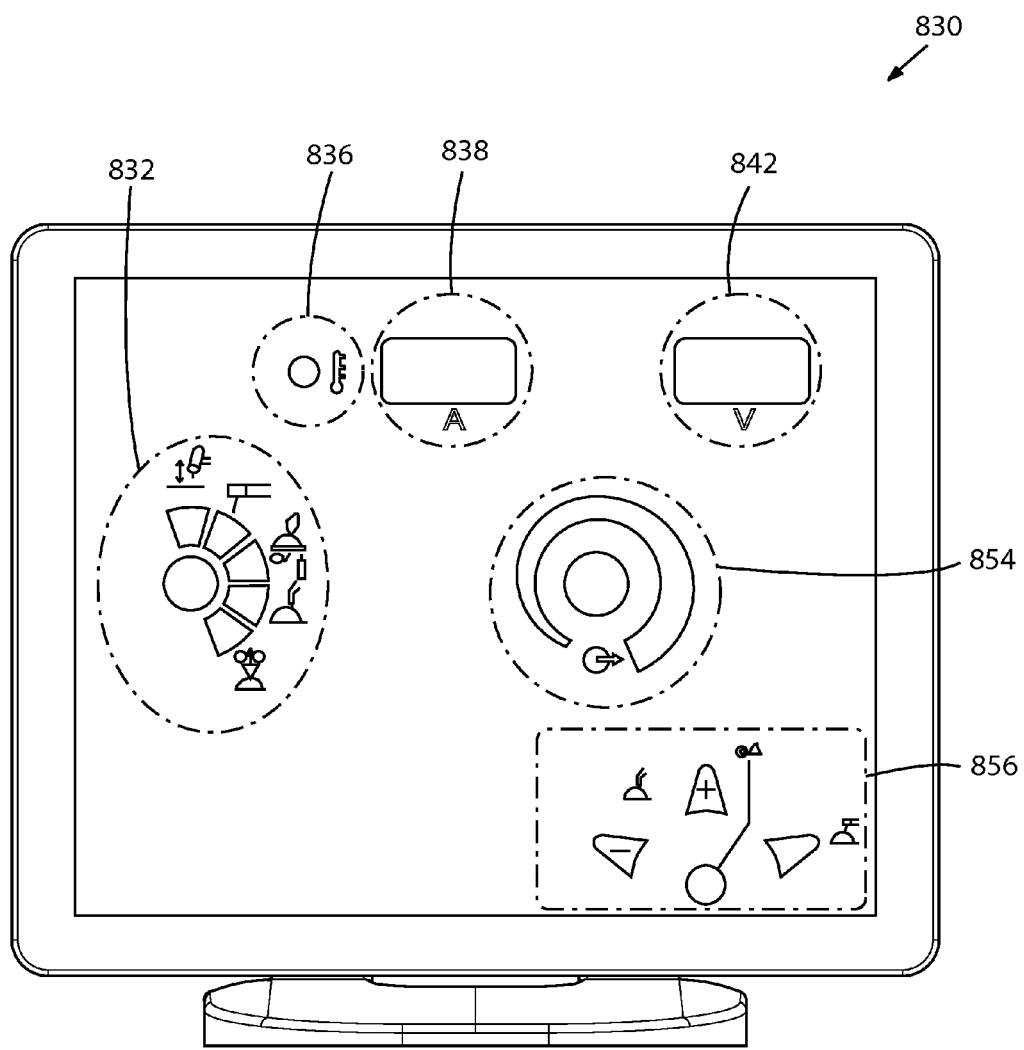
FIG. 12 is a front elevational view illustrating a user interface to communicate with a virtual welding system.
Figure 13:
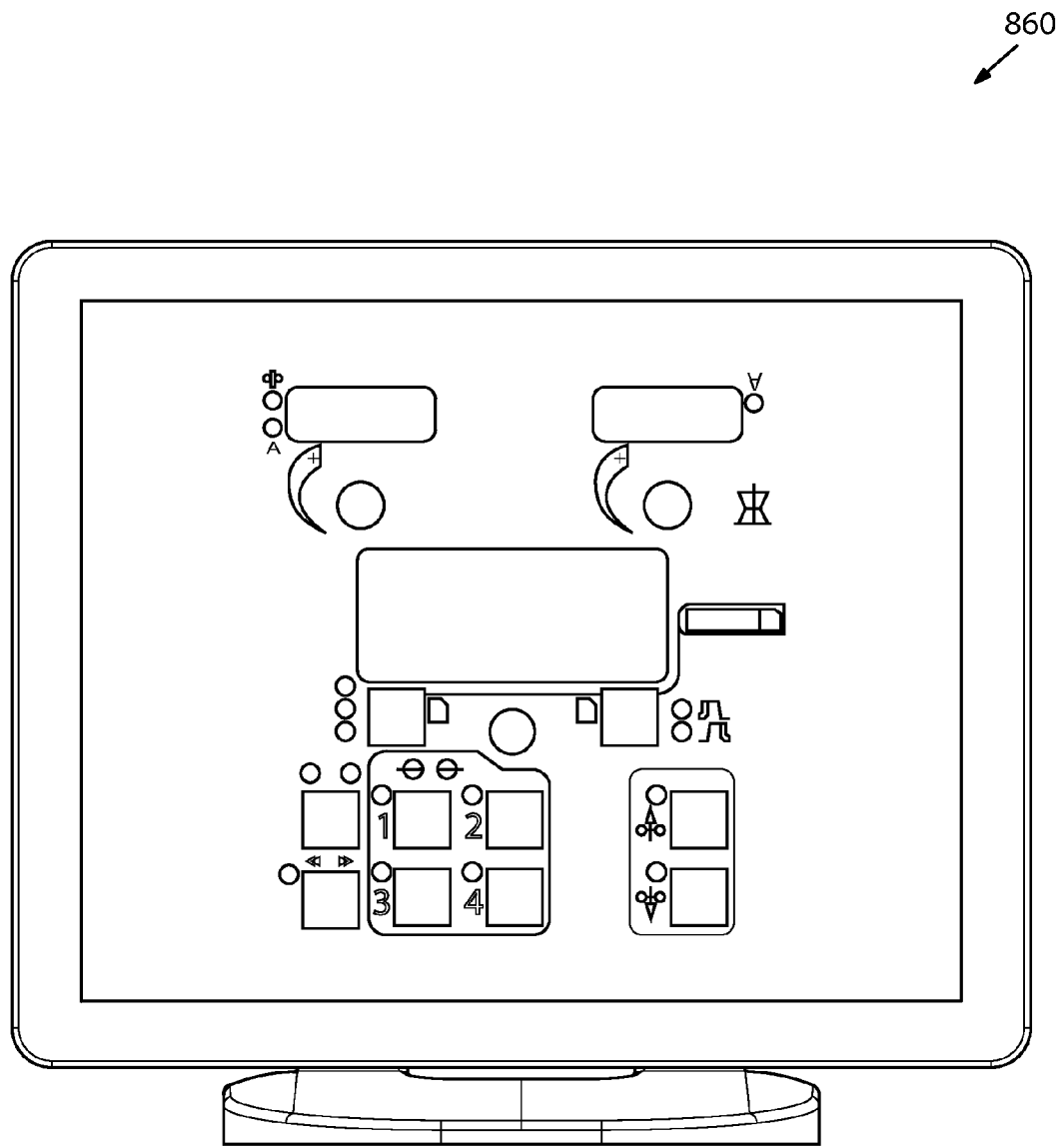
FIG. 13 is a front elevational view illustrating an alternate user interface to communicate with a virtual welding system.

FIG. 12 illustrates an exemplary user interface 830 that displays a plurality of metrics associated with a typical weld system. The interface 830 includes a selector 832 to identify the type of adapter utilized with the simulated weld system. A temperature gauge 836, a current gauge 838, and a voltage gauge 842 can provide real-time feedback to a user during weld operation. Similarly, 854 and 856 display additional information and allow user input to modify the same. FIG. 13 shows an alternate user interface 860 that simulates a real world hardware weld system interface. In an embodiment, a user is able to provide input to the display 860 using a touch screen or other peripheral input method as described herein.

Figure 14:
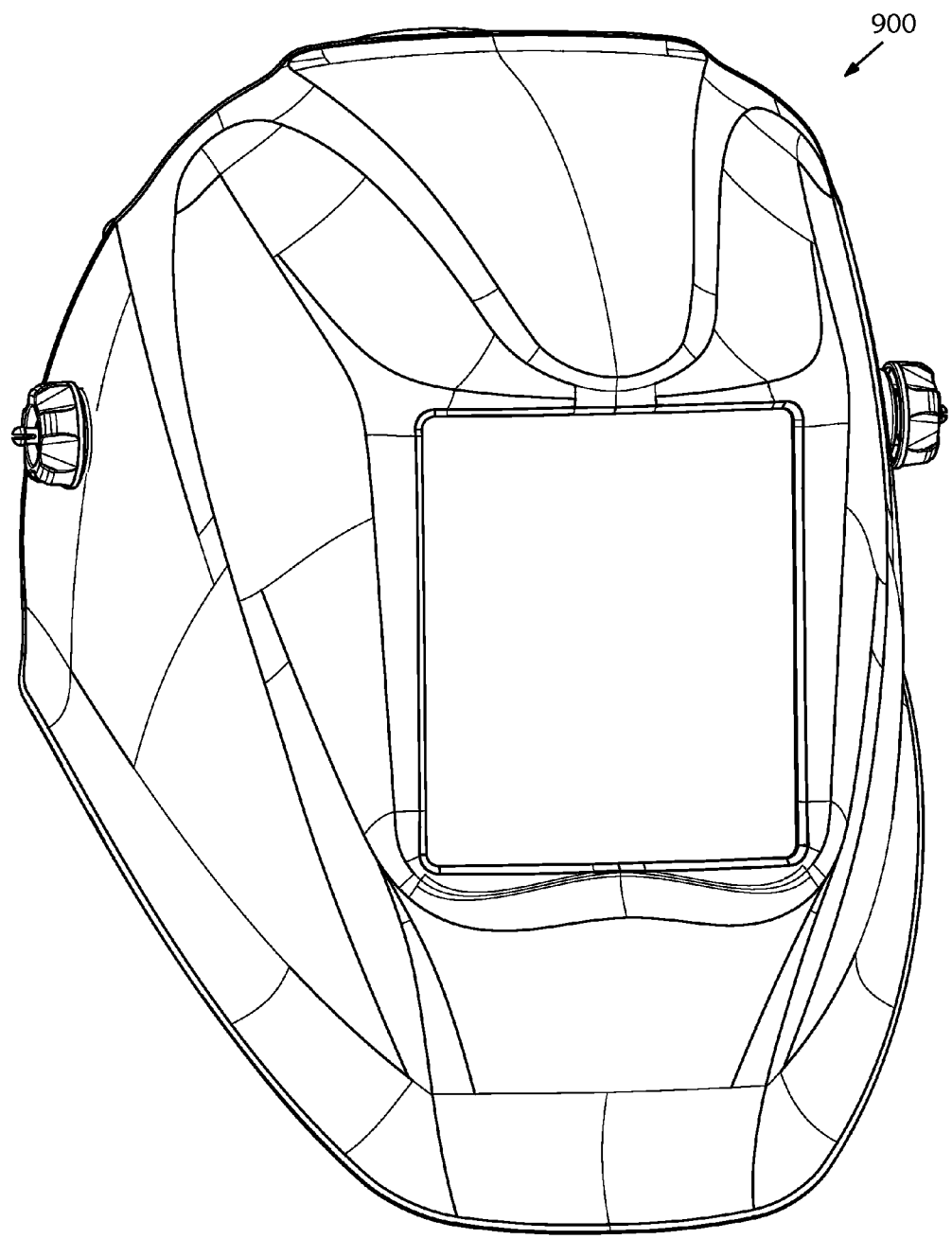
FIG. 14 is a perspective view of a helmet that can be used by a user within a virtual welding system.
Figure 15:
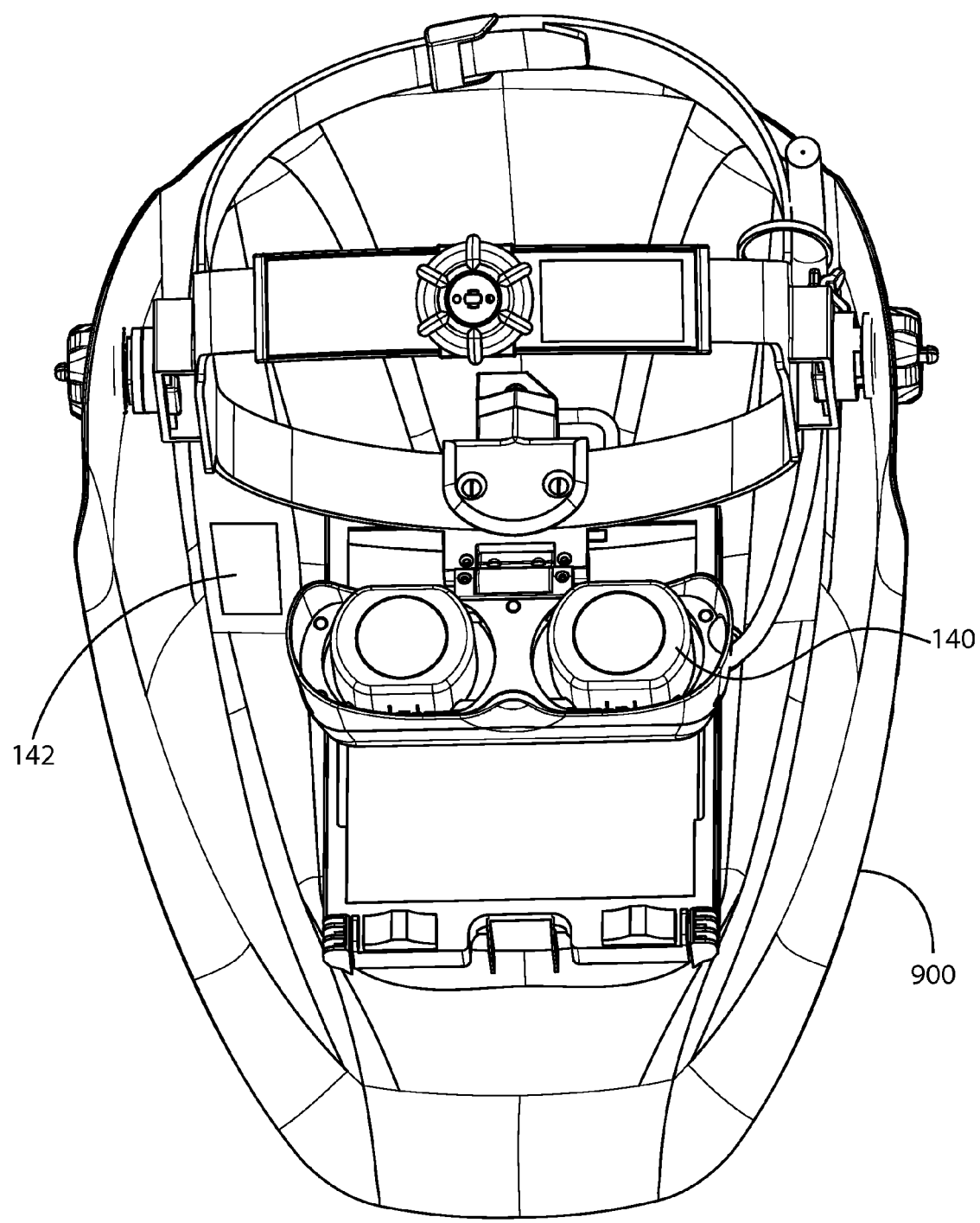
FIG. 15 is a rear perspective view of an FMDD mounted within a welding helmet that is used within a virtual welding system.

FIGS. 14 and 15 illustrate a helmet 900 that is worn by the user when operating the virtual welding system. FIG. 14 shows a front perspective view of the helmet 900, which can be an actual welding helmet used in real-world application and retrofitted to include the FMDD, as described above. In this manner, a user can wear a welding helmet just as they would in a real world scenario wherein the virtual environment is displayed to the user in real-time via the FMDD 140. FIG. 15 illustrates an example embodiment of the FMDD 140 of integrated into a welding helmet 900. The FMDD 140 operatively connects to the PPS 110 and the ST 120 either via wired means or wirelessly. A sensor 142 of the ST 120 may be attached to the FMDD 140 or to the welding helmet 900, in accordance with various embodiments of the present invention, allowing the FMDD 140 and/or welding helmet 900 to be tracked with respect to the 3D spatial frame of reference created by the ST 120.

Figure 16:
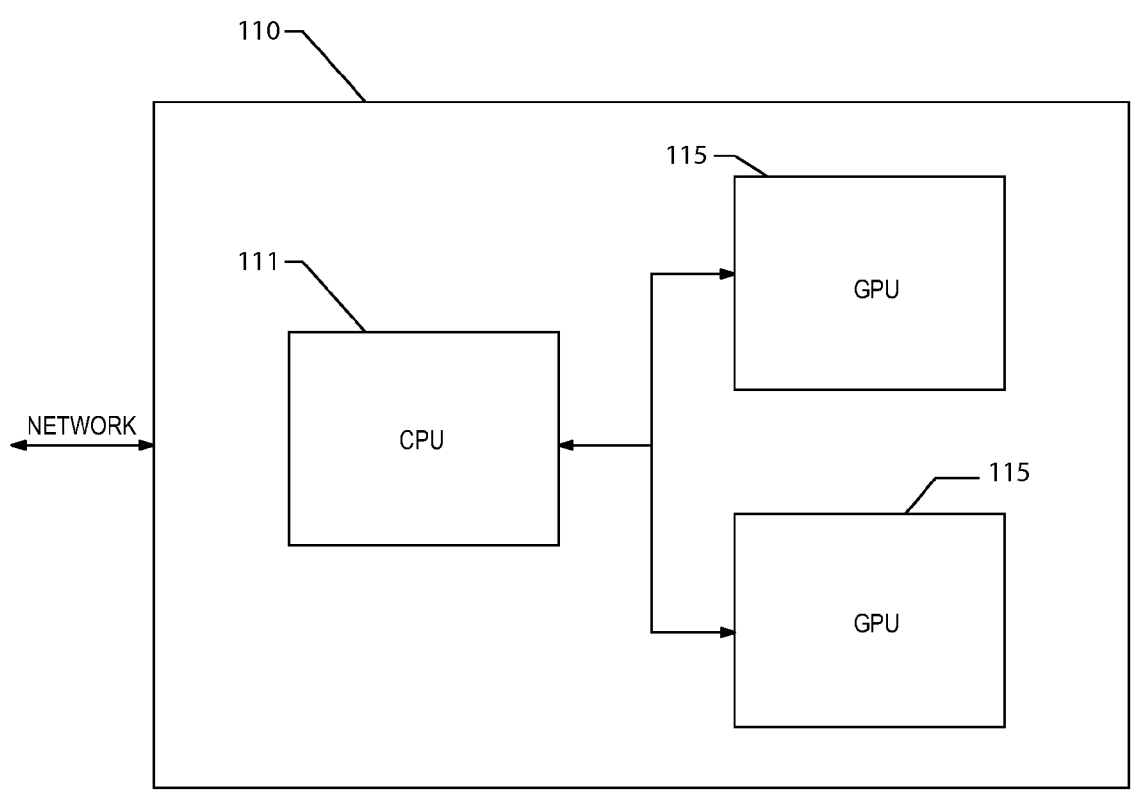
FIG. 16 is a flow diagram of an example embodiment of a subsystem block diagram of a programmable processor-based subsystem (PPS) shown in FIG. 1.

FIG. 16 illustrates an example embodiment of a subsystem block diagram of the programmable processor-based subsystem (PPS) 110 of the virtual welding system 100 of FIG. 1. The PPS 110 includes a central processing unit (CPU) 111 and one or more graphics processing units (GPU) 115, in accordance with an embodiment of the present invention. In one embodiment, one GPU 115 is used to provide monoscopic vision on the FMDD 140. In another embodiment, two GPUs 115 are programmed to provide stereoscopic vision on the FMDD 140. In either case, a user views a virtual reality simulation of a weld puddle (a.k.a. a weld pool) having real-time molten metal fluidity and heat absorption and dissipation characteristics, in accordance with an embodiment of the present invention.

Figure 17:
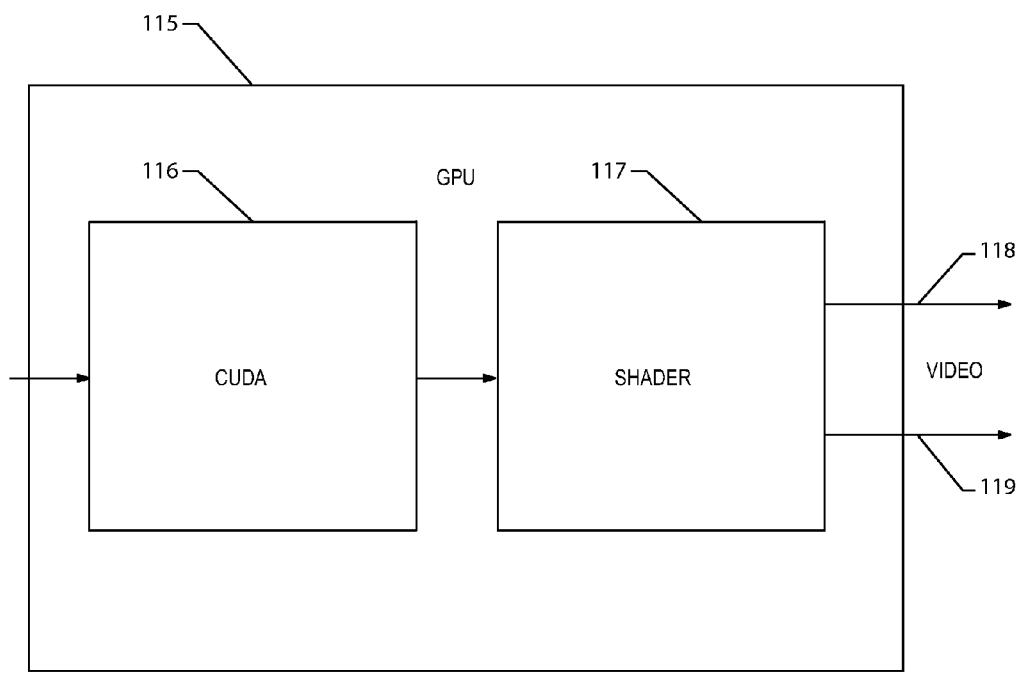
FIG. 17 is a flow diagram of an example embodiment of a block diagram of a graphics processing unit of the PPS of FIG. 16.

FIG. 17 illustrates an example embodiment of a block diagram of a graphics processing unit (GPU) 115 of the PPS 110 of FIG. 10. Each GPU 115 supports the implementation of data parallel algorithms. In accordance with an embodiment of the present invention, each GPU 115 provides two video outputs 118 and 119 capable of providing two virtual reality views. Two of the video outputs may be routed to the FMDD 140, rendering the welder's point of view, and a third video output may be routed to the ODD 150, for example, rendering either the welder's point of view or some other point of view. The remaining fourth video output may be routed to a projector, for example. Both GPUs 115 perform the same welding physics computations but may render the virtual reality environment from the same or different points of view. The GPU 115 includes a compute unified device architecture (CUDA) 116 and a shader 117. The CUDA 116 is the computing engine of the GPU 115 which is accessible to software developers through industry standard programming languages. The CUDA 116 includes parallel cores and is used to run the physics model of the weld puddle simulation described herein. The CPU 111 provides real-time welding input data to the CUDA 116 on the GPU 115. The shader 117 is responsible for drawing and applying all of the visuals of the simulation. Bead and puddle visuals are driven by the state of a wexel displacement map which is described later herein. In accordance with an embodiment of the present invention, the physics model runs and updates at a rate of about 30 times per second.

Figure 18:
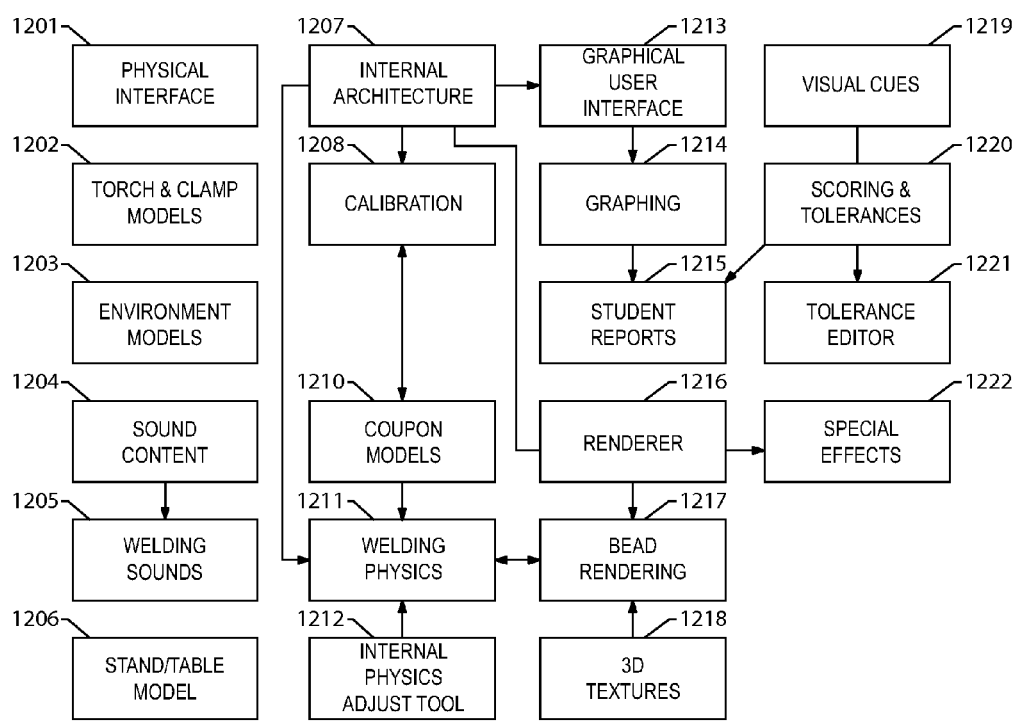
FIG. 18 is a flow diagram of an example embodiment of a functional block diagram of the system of FIG. 1.

FIG. 18 illustrates an example embodiment of a functional block diagram of the virtual welding system 100 of FIG. 1. The various functional blocks of the virtual welding system 100 as shown in FIG. 12 are implemented largely via software instructions and modules running on the PPS 110. The various functional blocks of the virtual welding system 100 include a physical interface 1201, torch and clamp models 1202, environment models 1203, sound content functionality 1204, welding sounds 1205, stand/table model 1206, internal architecture functionality 1207, calibration functionality 1208, welding coupon models 1210, welding physics 1211, internal physics adjustment tool (tweaker) 1212, graphical user interface functionality 1213, graphing functionality 1214, student reports functionality 1215, renderer 1216, bead rendering 1217, 3D textures 1218, visual cues functionality 1219, scoring and tolerance functionality 1220, tolerance editor 1221, and spatial effects 1222.

The internal architecture functionality 1207 provides the higher level software logistics of the processes of the virtual welding system 100 including, for example, loading files, holding information, managing threads, turning the physics model on, and triggering menus. The internal architecture functionality 1207 runs on the CPU 111, in accordance with an embodiment of the present invention. Certain real-time inputs to the PPS 110 include arc location, gun position, FMDD or helmet position, gun on/off state, and contact made state (yes/no).

The graphical user interface functionality 1213 allows a user, through the ODD 150 using the joystick 132 of the physical user interface 130, to set up a welding scenario. In accordance with an embodiment of the present invention, the set up of a welding scenario includes selecting a language, entering a user name, selecting a practice plate (i.e., a welding coupon), selecting a welding process (e.g., FCAW, GMAW, SMAW) and associated axial spray, pulse, or short arc methods, selecting a gas type and flow rate, selecting a type of stick electrode (e.g., 6010 or 7018), and selecting a type of flux cored wire (e.g., self-shielded, gas-shielded). The set up of a welding scenario also includes selecting a table height, an arm height, an arm position, and an arm rotation of the stand 170. The set up of a welding scenario further includes selecting an environment (e.g., a background environment in virtual reality space), setting a wire feed speed, setting a voltage level, setting an amperage, selecting a polarity, and turning particular visual cues on or off.

During a simulated welding scenario, the graphing functionality 1214 gathers user performance parameters and provides the user performance parameters to the graphical user interface functionality 1213 for display in a graphical format (e.g., on the ODD 150). Tracking information from the ST 120 feeds into the graphing functionality 1214. The graphing functionality 1214 includes a simple analysis module (SAM) and a whip/weave analysis module (WWAM). The SAM analyzes user welding parameters including welding travel angle, travel speed, weld angle, position, and tip to work distance by comparing the welding parameters to data stored in bead tables. The WWAM analyzes user whipping parameters including dime spacing, whip time, and puddle time. The WWAM also analyzes user weaving parameters including width of weave, weave spacing, and weave timing. The SAM and WWAM interpret raw input data (e.g., position and orientation data) into functionally usable data for graphing. For each parameter analyzed by the SAM and the WWAM, a tolerance window is defined by parameter limits around an optimum or ideal set point input into bead tables using the tolerance editor 1221, and scoring and tolerance functionality 1220 is performed.

The tolerance editor 1221 includes a weldometer which approximates material usage, electrical usage, and welding time. Furthermore, when certain parameters are out of tolerance, welding discontinuities (i.e., welding defects) may occur. The state of any welding discontinuities are processed by the graphing functionality 1214 and presented via the graphical user interface functionality 1213 in a graphical format. Such welding discontinuities include improper weld size, poor bead placement, concave bead, excessive convexity, undercut, porosity, incomplete fusion, slag entrapment, overfill, burnthrough, and excessive spatter. In accordance with an embodiment of the present invention, the level or amount of a discontinuity is dependent on how far away a particular user parameter is from the optimum or ideal set point.

Different parameter limits may be pre-defined for different types of users such as, for example, welding novices, welding experts, and persons at a trade show. The scoring and tolerance functionality 1220 provide number scores depending on how close to optimum (ideal) a user is for a particular parameter and depending on the level of discontinuities or defects present in the weld. The optimum values are derived from real-world data. Information from the scoring and tolerance functionality 1220 and from the graphics functionality 1214 may be used by the student reports functionality 1215 to create a performance report for an instructor and/or a student.

The virtual welding system 100 is capable of analyzing and displaying the results of virtual welding activity. By analyzing the results, it is meant that virtual welding system 100 is capable of determining when during the welding pass and where along the weld joints, the user deviated from the acceptable limits of the welding process. A score may be attributed to the user's performance. In one embodiment, the score may be a function of deviation in position, orientation and speed of the mock welding tool 160 through ranges of tolerances, which may extend from an ideal welding pass to marginal or unacceptable welding activity. Any gradient of ranges may be incorporated into the virtual welding system 100 as chosen for scoring the user's performance. Scoring may be displayed numerically or alpha-numerically. Additionally, the user's performance may be displayed graphically showing, in time and/or position along the weld joint, how closely the mock welding tool traversed the weld joint. Parameters such as travel angle, work angle, speed, and distance from the weld joint are examples of what may be measured, although any parameters may be analyzed for scoring purposes. The tolerance ranges of the parameters are taken from real-world welding data, thereby providing accurate feedback as to how the user will perform in the real world. In another embodiment, analysis of the defects corresponding to the user's performance may also be incorporated and displayed on the ODD 150. In this embodiment, a graph may be depicted indicating what type of discontinuity resulted from measuring the various parameters monitored during the virtual welding activity. While occlusions may not be visible on the ODD 150, defects may still have occurred as a result of the user's performance, the results of which may still be correspondingly displayed, i.e. graphed.

Visual cues functionality 1219 provide immediate feedback to the user by displaying overlaid colors and indicators on the FMDD 140 and/or the ODD 150. Visual cues are provided for each of the welding parameters 151 including position, tip to work distance, weld angle, travel angle, travel speed, and arc length (e.g., for stick welding) and visually indicate to the user if some aspect of the user's welding technique should be adjusted based on the predefined limits or tolerances. Visual cues may also be provided for whip/weave technique and weld bead "dime" spacing, for example. Visual cues may be set independently or in any desired combination.

Calibration functionality 1208 provides the capability to match up physical components in real world space (3D frame of reference) with visual components in virtual reality space. Each different type of welding coupon (WC) is calibrated in the factory by mounting the WC to the arm 714 of the stand 170 and touching the WC at predefined points (indicated by, for example, three dimples on the WC) with a calibration stylus operatively connected to the ST 120. The ST 120 reads the magnetic field intensities at the predefined points, provides position information to the PPS 110, and the PPS 110 uses the position information to perform the calibration (i.e., the translation from real world space to virtual reality space).

Any particular type of WC fits into the arm 714 of the stand 170 in the same repeatable way to within very tight tolerances. In one example, the distance between the coupon 758 and the magnet 710 on the arm 714 is a known distance 178 as set forth in FIG. 2 above. Therefore, once a particular WC type is calibrated, that WC type does not have to be re-calibrated (i.e., calibration of a particular type of WC is a one-time event). WCs of the same type are interchangeable. Calibration ensures that physical feedback perceived by the user during a welding process matches up with what is displayed to the user in virtual reality space, making the simulation seem more real. For example, if the user slides the tip of a MWT 160 around the corner of an actual WC 180, the user will see the tip sliding around the corner of the virtual WC on the FMDD 140 as the user feels the tip sliding around the actual corner. In accordance with an embodiment of the present invention, the MWT 160 is placed in a pre-positioned jig and is calibrated as well, based on the known jig position.

In accordance with an alternative embodiment of the present invention, "smart" coupons are provided, having sensors on, for example, the corners of the coupons. The ST 120 is able to track the corners of a "smart" welding coupon such that the virtual welding system 100 continuously knows where the "smart" welding coupon is in real world 3D space. In accordance with a further alternative embodiment of the present invention, licensing keys are provided to "unlock" welding coupons. When a particular WC is purchased, a licensing key is provided allowing the user to enter the licensing key into the virtual welding system 100, unlocking the software associated with that WC. In accordance with another embodiment of the present invention, spatial non-standard welding coupons may be provided based on real-world CAD drawings of parts. Users may be able to train on welding a CAD part even before the part is actually produced in the real world.

Sound content functionality 1204 and welding sounds 1205 provide particular types of welding sounds that change depending on if certain welding parameters are within tolerance or out of tolerance. Sounds are tailored to the various welding processes and parameters. For example, in a MIG spray arc welding process, a crackling sound is provided when the user does not have the MWT 160 positioned correctly, and a hissing sound is provided when the MWT 160 is positioned correctly. In a short arc welding process, a steady crackling or frying sound is provided for proper welding technique, and a hissing sound may be provided when undercutting is occurring. These sounds mimic real world sounds corresponding to correct and incorrect welding technique.

High fidelity sound content may be taken from real world recordings of actual welding using a variety of electronic and mechanical means, in accordance with various embodiments of the present invention. In accordance with an embodiment of the present invention, the perceived volume and directionality of sound is modified depending on the position, orientation, and distance of the user's head (assuming the user is wearing a FMDD 140 that is tracked by the ST 120) with respect to the simulated arc between the MWT 160 and the WC 180. Sound may be provided to the user via ear bud speakers in the helmet 900 or via speakers configured in the console 135 or stand 170, for example.

Environment models 1203 are provided to provide various background scenes (still and moving) in virtual reality space. Such background environments may include, for example, an indoor welding shop, an outdoor race track, a garage, etc. and may include moving cars, people, birds, clouds, and various environmental sounds. The background environment may be interactive, in accordance with an embodiment of the present invention. For example, a user may have to survey a background area, before starting welding, to ensure that the environment is appropriate (e.g., safe) for welding. Torch and clamp models 1202 are provided which model various MWTs 160 including, for example, guns, holders with stick electrodes, etc. in virtual reality space.

Coupon models 1210 are provided which model various WCs 180 including, for example, flat plate coupons, T-joint coupons, butt-joint coupons, groove-weld coupons, and pipe coupons (e.g., 2-inch diameter pipe and 6-inch diameter pipe) in virtual reality space. Alternatively or in addition, welding coupon models can include multi-versions, wherein the coupons include one or more welding coupon types within a single form factor. For example, an exemplary multi-welding coupon may include a T-joint, butt-joint, and groove-weld in a single component. A stand/table model 1206 is provided which models the various parts of the stand 700 including an adjustable arm 714, a base 724, and an upright 174 used to couple the adjustable arm to the base as used in virtual reality space. A physical interface model 1201 is provided which models the various parts of the welding user interface 130, console 135, and ODD 150 in virtual reality space.

In accordance with an embodiment of the present invention, simulation of a weld puddle or pool in virtual reality space is accomplished where the simulated weld puddle has real-time molten metal fluidity and heat dissipation characteristics. At the heart of the weld puddle simulation is the welding physics functionality 1211 (a.k.a., the physics model) which is run on the GPUs 115, in accordance with an embodiment of the present invention. The welding physics functionality employs a double displacement layer technique to accurately model dynamic fluidity/viscosity, solidity, heat gradient (heat absorption and dissipation), puddle wake, and bead shape, and is described in more detail herein with respect to FIGS. 14A-14C.

The welding physics functionality 1211 communicates with the bead rendering functionality 1217 to render a weld bead in all states from the heated molten state to the cooled solidified state. The bead rendering functionality 1217 uses information from the welding physics functionality 1211 (e.g., heat, fluidity, displacement, dime spacing) to accurately and realistically render a weld bead in virtual reality space in real-time. The 3D textures functionality 1218 provides texture maps to the bead rendering functionality 1217 to overlay additional textures (e.g., scorching, slag, grain) onto the simulated weld bead. For example, slag may be shown rendered over a weld bead during and just after a welding process, and then removed to reveal the underlying weld bead. The renderer functionality 1216 is used to render various non-puddle specific characteristics using information from the spatial effects module 1222 including sparks, spatter; smoke, arc glow, fumes and gases, and certain discontinuities such as, for example, undercut and porosity.

The internal physics adjustment tool 1212 is a tweaking tool that allows various welding physics parameters to be defined, updated, and modified for the various welding processes. In accordance with an embodiment of the present invention, the internal physics adjustment tool 1212 runs on the CPU 111 and the adjusted or updated parameters are downloaded to the GPUs 115. The types of parameters that may be adjusted via the internal physics adjustment tool 1212 include parameters related to welding coupons, process parameters that allow a process to be changed without having to reset a welding coupon (allows for doing a second pass), various global parameters that can be changed without resetting the entire simulation, and other various parameters.

Figure 19:
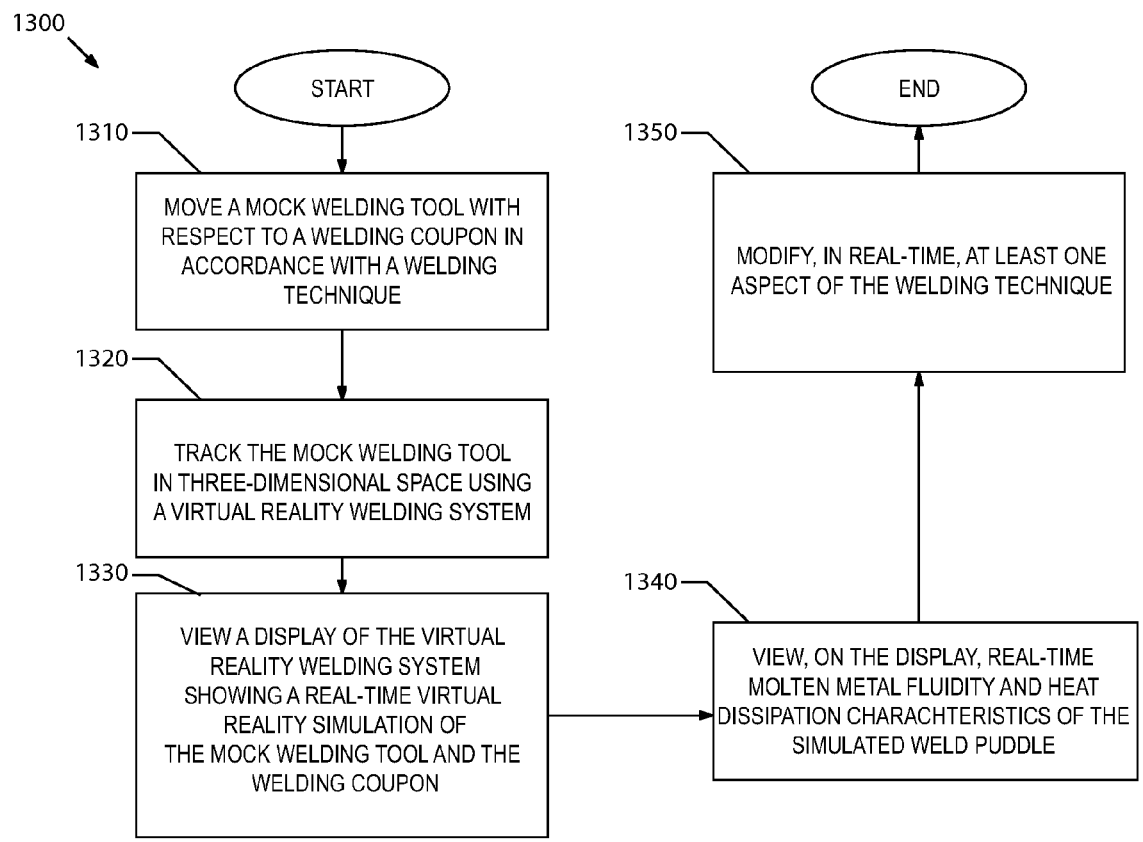
FIG. 19 is a flowchart of an embodiment of a method of training using the virtual reality training system of FIG. 1.

FIG. 19 is a flow chart of an embodiment of a method 1300 of training using the virtual welding system 100 of FIG. 1. In step 1310, move a mock welding tool with respect to a welding coupon in accordance with a welding technique. In step 1320, track position and orientation of the mock welding tool in three-dimensional space using a virtual reality system. In step 1330, view a display of the virtual reality welding system showing a real-time virtual reality simulation of the mock welding tool and the welding coupon in a virtual reality space as the simulated mock welding tool deposits a simulated weld bead material onto at least one simulated surface of the simulated welding coupon by forming a simulated weld puddle in the vicinity of a simulated arc emitting from said simulated mock welding tool. In step 1340, view on the display, real-time molten metal fluidity and heat dissipation characteristics of the simulated weld puddle. In step 1350, modify in real-time, at least one aspect of the welding technique in response to viewing the real-time molten metal fluidity and heat dissipation characteristics of the simulated weld puddle.

The method 1300 illustrates how a user is able to view a weld puddle in virtual reality space and modify his welding technique in response to viewing various characteristics of the simulated weld puddle, including real-time molten metal fluidity (e.g., viscosity) and heat dissipation. The user may also view and respond to other characteristics including real-time puddle wake and dime spacing. Viewing and responding to characteristics of the weld puddle is how most welding operations are actually performed in the real world. The double displacement layer modeling of the welding physics functionality 1211 run on the GPUs 115 allows for such real-time molten metal fluidity and heat dissipation characteristics to be accurately modeled and represented to the user. For example, heat dissipation determines solidification time (i.e., how much time it takes for a wexel to completely solidify).

Furthermore, a user may make a second pass over the weld bead material using the same or a different (e.g., a second) mock welding tool and/or welding process. In such a second pass scenario, the simulation shows the simulated mock welding tool, the welding coupon, and the original simulated weld bead material in virtual reality space as the simulated mock welding tool deposits a second simulated weld bead material merging with the first simulated weld bead material by forming a second simulated weld puddle in the vicinity of a simulated arc emitting from the simulated mock welding tool. Additional subsequent passes using the same or different welding tools or processes may be made in a similar manner. In any second or subsequent pass, the previous weld bead material is merged with the new weld bead material being deposited as a new weld puddle is formed in virtual reality space from the combination of any of the previous weld bead material, the new weld bead material, and possibly the underlying welding coupon material in accordance with certain embodiments of the present invention. Such subsequent passes may be needed to make a large fillet or groove weld, performed to repair a weld bead formed by a previous pass, for example, or may include a hot pass and one or more fill and cap passes after a root pass as is done in pipe welding. In accordance with various embodiments of the present invention, weld bead and base material may include mild steel, stainless steel, aluminum, nickel based alloys, or other materials.

FIGS. 20A-20B illustrate the concept of a welding element (wexel) displacement map 1420, in accordance with an embodiment of the present invention. FIG. 20A shows a side view of a flat welding coupon (WC) 1400 having a flat top surface 1410. The welding coupon 1400 exists in the real world as, for example, a plastic part, and also exists in virtual reality space as a simulated welding coupon. FIG. 20B shows a representation of the top surface 1410 of the simulated WC 1400 broken up into a grid or array of welding elements (i.e., wexels) forming a wexel map 1420. Each wexel (e.g., wexel 1421) defines a small portion of the surface 1410 of the welding coupon. The wexel map defines the surface resolution. Changeable channel parameter values are assigned to each wexel, allowing values of each wexel to dynamically change in real-time in virtual reality weld space during a simulated welding process. The changeable channel parameter values correspond to the channels Puddle (molten metal fluidity/viscosity displacement), Heat (heat absorption/dissipation), Displacement (solid displacement), and Extra (various extra states, e.g., slag, grain, scorching, virgin metal). These changeable channels are referred to herein as PHED for Puddle, Heat, Extra, and Displacement, respectively.

Figure 20:
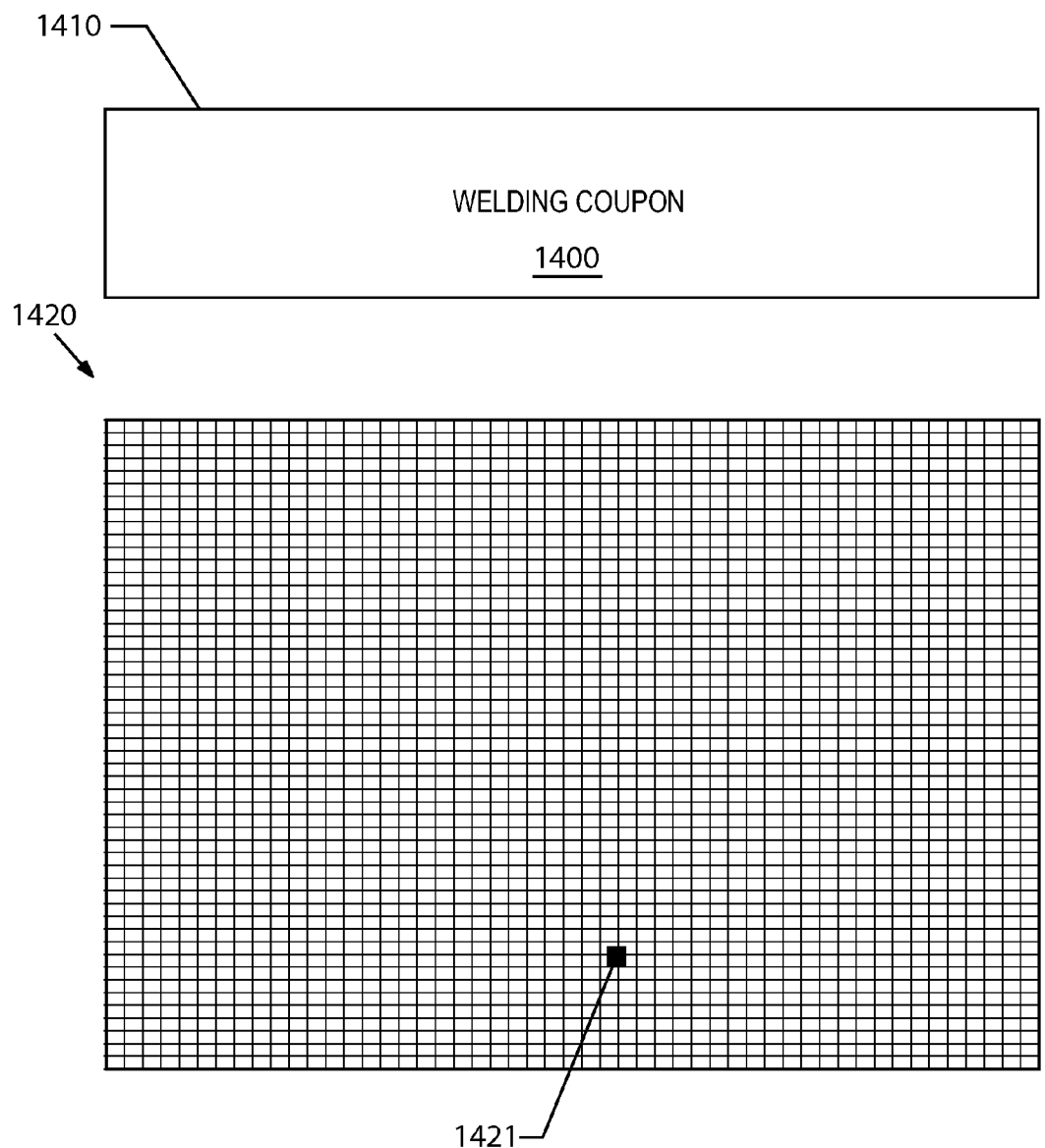
FIG. 20 is an elevation view showing a welding pixel (wexel) displacement map, in accordance with an embodiment of the present invention.

FIG. 20 illustrates an example embodiment of a welding coupon space and a weld space of the flat welding coupon (WC) 1400 of FIG. 14 simulated in the virtual welding system 100 of FIG. 1. Points O, X, Y, and Z define the local 3D welding coupon space. In general, each welding coupon type defines the mapping from 3D welding coupon space to 2D virtual reality weld space. The wexel map 1420 of FIG. 20 is a two-dimensional array of values that map to weld space in virtual reality. A user is to weld from point B to point E as shown in FIG. 20. A trajectory line from point B to point E is shown in both 3D welding coupon space and 2D weld space in FIG. 20.

Figure 21:
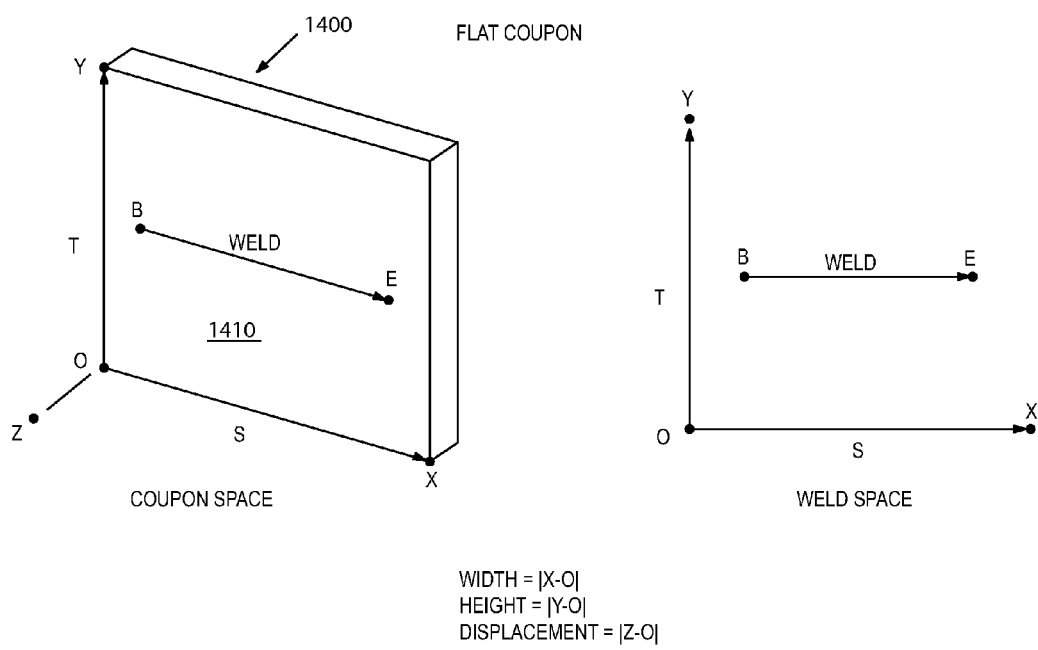
FIG. 21 is a perspective view of a coupon space and corresponding x-y weld space plot of a flat welding coupon simulated in the system of FIG. 1.

Each type of welding coupon defines the direction of displacement for each location in the wexel map. For the flat welding coupon of FIG. 21, the direction of displacement is the same at all locations in the wexel map (i.e., in the Z-direction). The texture coordinates of the wexel map are shown as S, T (sometimes called U, V) in both 3D welding coupon space and 2D weld space, in order to clarify the mapping. The wexel map is mapped to and represents the rectangular surface 1410 of the welding coupon 1400.

Figure 22:
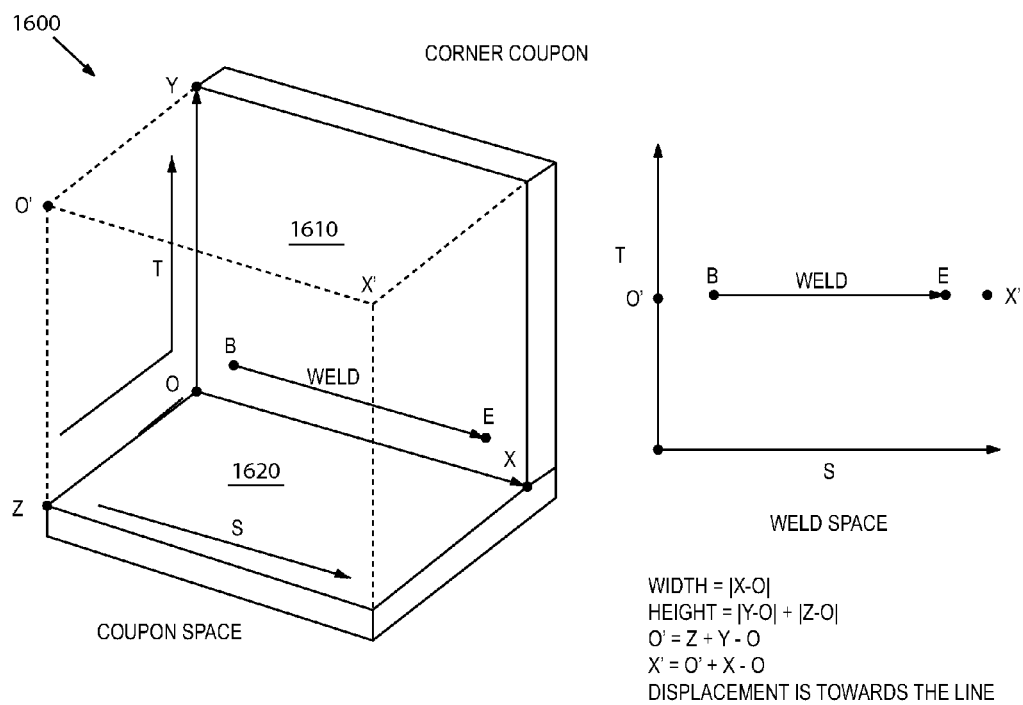
FIG. 22 is a perspective view of a corner and corresponding T-S weld space plot of a corner (tee joint) welding coupon simulated in the system of FIG. 1.

FIG. 22 illustrates an example embodiment of a welding coupon space and a weld space of a corner (tee joint) welding coupon (WC) 1600 simulated in the virtual welding system 100 of FIG. 1. The corner WC 1600 has two surfaces 1610 and 1620 in 3D welding coupon space that are mapped to 2D weld space as shown in FIG. 22. Again, points O, X, Y, and Z define the local 3D welding coupon space. The texture coordinates of the wexel map are shown as S, T in both 3D welding coupon space and 2D weld space, in order to clarify the mapping. A user is to weld from point B to point E as shown in FIG. 22. A trajectory line from point B to point E is shown in both 3D welding coupon space and 2D weld space in FIG. 22. However, the direction of displacement is towards the line X'-O' as shown in the 3D welding coupon space, towards the opposite corner as shown in FIG. 22.

Figure 23:
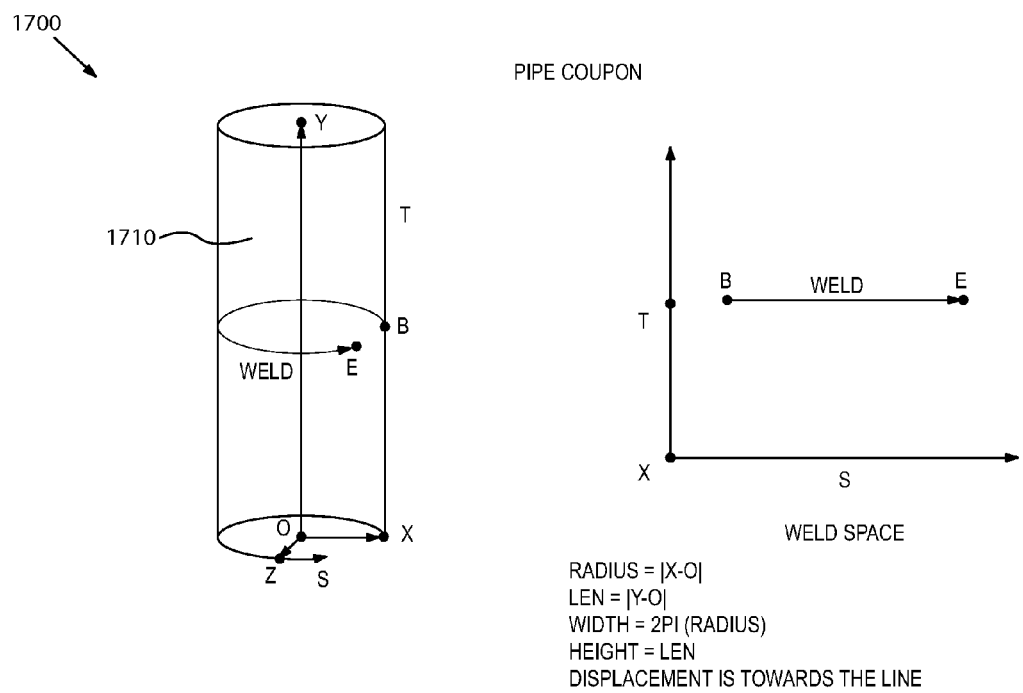
FIG. 23 is a perspective view of a pipe coupon and corresponding T-S weld space plot of a pipe welding coupon simulated in the system of FIG. 1.

FIG. 23 illustrates an example embodiment of a welding coupon space and a weld space of a pipe welding coupon (WC) 1700 simulated in the virtual welding system 100 of FIG. 1. The pipe WC 1700 has a curved surface 1710 in 3D welding coupon space that is mapped to 2D weld space as shown in FIG. 23. Again, points O, X, Y, and Z define the local 3D welding coupon space. The texture coordinates of the wexel map are shown as S, T in both 3D welding coupon space and 2D weld space, in order to clarify the mapping. A user is to weld from point B to point E along a curved trajectory as shown in FIG. 23. A trajectory curve and line from point B to point E is shown in 3D welding coupon space and 2D weld space, respectively, in FIG. 23. The direction of displacement is away from the line Y-O (i.e., away from the center of the pipe).

In a similar manner that a texture map may be mapped to a rectangular surface area of a geometry, a weldable wexel map may be mapped to a rectangular surface of a welding coupon. Each element of the weldable map is termed a wexel in the same sense that each element of a picture is termed a pixel (a contraction of picture element). A pixel contains channels of information that define a color (e.g., red, green, blue, etc.). A wexel contains channels of information (e.g., P, H, E, D) that define a weldable surface in virtual reality space.

In accordance with an embodiment of the present invention, the format of a wexel is summarized as channels PHED (Puddle, Heat, Extra, Displacement) which contains four floating point numbers. The Extra channel is treated as a set of bits which store logical information about the wexel such as, for example, whether or not there is any slag at the wexel location. The Puddle channel stores a displacement value for any liquefied metal at the wexel location. The Displacement channel stores a displacement value for the solidified metal at the wexel location. The Heat channel stores a value giving the magnitude of heat at the wexel location. In this way, the weldable part of the welding coupon can show displacement due to a welded bead, a shimmering surface "puddle" due to liquid metal, color due to heat, etc. All of these effects are achieved by the vertex and pixel shaders applied to the weldable surface.

In accordance with an embodiment of the present invention, a displacement map and a particle system are used where the particles can interact with each other and collide with the displacement map. The particles are virtual dynamic fluid particles and provide the liquid behavior of the weld puddle but are not rendered directly (i.e., are not visually seen directly). Instead, only the particle effects on the displacement map are visually seen. Heat input to a wexel affects the movement of nearby particles. There are two types of displacement involved in simulating a welding puddle which include Puddle and Displacement. Puddle is "temporary" and only lasts as long as there are particles and heat present. Displacement is "permanent". Puddle displacement is the liquid metal of the weld which changes rapidly (e.g., shimmers) and can be thought of as being "on top" of the Displacement. The particles overlay a portion of a virtual surface displacement map (i.e., a wexel map). The Displacement represents the permanent solid metal including both the initial base metal and the weld bead that has solidified.

In accordance with an embodiment of the present invention, the simulated welding process in virtual reality space works as follows: Particles stream from the emitter (emitter of the simulated MWT 160) in a thin cone. The particles make first contact with the surface of the simulated welding coupon where the surface is defined by a wexel map. The particles interact with each other and the wexel map and build up in real-time. More heat is added the nearer a wexel is to the emitter. Heat is modeled in dependence on distance from the arc point and the amount of time that heat is input from the arc. Certain visuals (e.g., color, etc.) are driven by the heat. A weld puddle is drawn or rendered in virtual reality space for wexels having enough heat. Wherever it is hot enough, the wexel map liquefies, causing the Puddle displacement to "raise up" for those wexel locations. Puddle displacement is determined by sampling the "highest" particles at each wexel location. As the emitter moves on along the weld trajectory, the wexel locations left behind cool. Heat is removed from a wexel location at a particular rate. When a cooling threshold is reached, the wexel map solidifies. As such, the Puddle displacement is gradually converted to Displacement (i.e., a solidified bead). Displacement added is equivalent to Puddle removed such that the overall height does not change. Particle lifetimes are tweaked or adjusted to persist until solidification is complete. Certain particle properties that are modeled in the virtual welding system 100 include attraction/repulsion, velocity (related to heat), dampening (related to heat dissipation), direction (related to gravity).

Figure 24A:
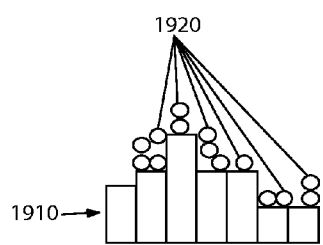
FIGS. 24A-24C are elevation views illustrating the concept of a dual displacement puddle of the system of FIG. 1.
Figure 24B:
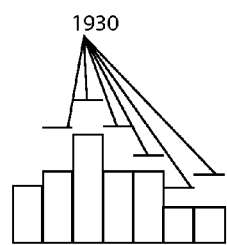
Figure 24C:
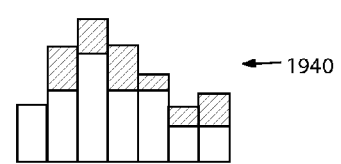

FIGS. 24A-24C illustrate an example embodiment of the concept of a dual-displacement (displacement and particles) puddle model of the virtual welding system 100 of FIG. 1. Welding coupons are simulated in virtual reality space having at least one surface. The surfaces of the welding coupon are simulated in virtual reality space as a double displacement layer including a solid displacement layer and a puddle displacement layer. The puddle displacement layer is capable of modifying the solid displacement layer.

As described herein, "puddle" is defined by an area of the wexel map where the Puddle value has been raised up by the presence of particles. The sampling process is represented in FIGS. 24A-24C. A section of a wexel map is shown having seven adjacent wexels. The current Displacement values are represented by un-shaded rectangular bars 1910 of a given height (i.e., a given displacement for each wexel). In FIG. 24A, the particles 1920 are shown as round un-shaded dots colliding with the current Displacement levels and are piled up. In FIG. 24B, the "highest" particle heights 1930 are sampled at each wexel location. In FIG. 24C, the shaded rectangles 1940 show how much Puddle has been added on top of the Displacement as a result of the particles. The weld puddle height is not instantly set to the sampled values since Puddle is added at a particular liquification rate based on Heat. Although not shown in FIGS. 24A-24C, it is possible to visualize the solidification process as the Puddle (shaded rectangles) gradually shrink and the Displacement (un-shaded rectangles) gradually grow from below to exactly take the place of the Puddle. In this manner, real-time molten metal fluidity characteristics are accurately simulated. As a user practices a particular welding process, the user is able to observe the molten metal fluidity characteristics and the heat dissipation characteristics of the weld puddle in real-time in virtual reality space and use this information to adjust or maintain his welding technique.

The number of wexels representing the surface of a welding coupon is fixed. Furthermore, the puddle particles that are generated by the simulation to model fluidity are temporary, as described herein. Therefore, once an initial puddle is generated in virtual reality space during a simulated welding process using the virtual welding system 100, the number of wexels plus puddle particles tends to remain relatively constant. This is because the number of wexels that are being processed is fixed and the number of puddle particles that exist and are being processed during the welding process tend to remain relatively constant because puddle particles are being created and "destroyed" at a similar rate (i.e., the puddle particles are temporary). Therefore, the processing load of the PPS 110 remains relatively constant during a simulated welding session.

In accordance with an alternate embodiment of the present invention, puddle particles may be generated within or below the surface of the welding coupon. In such an embodiment, displacement may be modeled as being positive or negative with respect to the original surface displacement of a virgin (i.e., un-welded) welding coupon. In this manner, puddle particles may not only build up on the surface of a welding coupon, but may also penetrate the welding coupon. However, the number of wexels is still fixed and the puddle particles being created and destroyed is still relatively constant.

In accordance with alternate embodiments of the present invention, instead of modeling particles, a wexel displacement map may be provided having more channels to model the fluidity of the puddle. Or, instead of modeling particles, a dense voxel map may be modeled. As used herein, a voxel (e.g., volumetric pixel) is a volume element, representing a value on a regular grid in three dimensional space. Or, instead of a wexel map, only particles may be modeled which are sampled and never go away. Such alternative embodiments may not provide a relatively constant processing load for the system, however.

Furthermore, in accordance with an embodiment of the present invention, blowthrough or a keyhole is simulated by taking material away. For example, if a user keeps an arc in the same location for too long, in the real world, the material would burn away causing a hole. Such real-world burnthrough is simulated in the virtual welding system 100 by wexel decimation techniques. If the amount of heat absorbed by a wexel is determined to be too high by the virtual welding system 100, that wexel may be flagged or designated as being burned away and rendered as such (e.g., rendered as a hole). Subsequently, however, wexel re-constitution may occur for certain welding process (e.g., pipe welding) where material is added back after being initially burned away. In general, the virtual welding system 100 simulates wexel decimation (taking material away) and wexel reconstitution (i.e., adding material back). Furthermore, removing material in root-pass welding is properly simulated in the virtual welding system 100.

Furthermore, removing material in root-pass welding is properly simulated in the virtual welding system 100. For example, in the real world, grinding of the root pass may be performed prior to subsequent welding passes. Similarly, virtual welding system 100 may simulate a grinding pass that removes material from the virtual weld joint. It will be appreciated that the material removed may be modeled as a negative displacement on the wexel map. That is to say that the grinding pass removes material that is modeled by the virtual welding system 100 resulting in an altered bead contour. Simulation of the grinding pass may be automatic, which is to say that the virtual welding system 100 removes a predetermined thickness of material, which may be respective to the surface of the root pass weld bead.

In an alternative embodiment, an actual grinding tool, or grinder, may be simulated that turns on and off by activation of the mock welding tool 160 or another input device. It is noted that the grinding tool may be simulated to resemble a real world grinder. In this embodiment, the user maneuvers the grinding tool along the root pass to remove material responsive to the movement thereof. It will be understood that the user may be allowed to remove too much material. In a manner similar to that described above, holes or other defects (described above) may result if the user grinds away too much material. Still, hard limits or stops may be implemented, i.e. programmed, to prevent the user from removing too much material or indicate when too much material is being removed.

In addition to the non-visible "puddle" particles described herein, the virtual welding system 100 also uses three other types of visible particles to represent Arc, Flame, and Spark effects, in accordance with an embodiment of the present invention. These types of particles do not interact with other particles of any type but interact only with the displacement map. While these particles do collide with the simulated weld surface, they do not interact with each other. Only Puddle particles interact with each other, in accordance with an embodiment of the present invention. The physics of the Spark particles is setup such that the Spark particles bounce around and are rendered as glowing dots in virtual reality space.

The physics of the Arc particles is setup such that the Arc particles hit the surface of the simulated welding coupon or weld bead and stay for a while. The Arc particles are rendered as larger dim bluish-white spots in virtual reality space. It takes many such spots superimposed to form any sort of visual image. The end result is a white glowing nimbus with blue edges.

The physics of the Flame particles is modeled to slowly raise upward. The Flame particles are rendered as medium sized dim red-yellow spots. It takes many such spots superimposed to form any sort of visual image. The end result is blobs of orange-red flames with red edges raising upward and fading out. Other types of non-puddle particles may be implemented in the virtual welding system 100, in accordance with other embodiments of the present invention. For example, smoke particles may be modeled and simulated in a similar manner to flame particles.

The final steps in the simulated visualization are handled by the vertex and pixel shaders provided by the shaders 117 of the GPUs 115. The vertex and pixel shaders apply Puddle and Displacement, as well as surface colors and reflectivity altered due to heat, etc. The Extra (E) channel of the PH ED wexel format, as discussed earlier herein, contains all of the extra information used per wexel. In accordance with an embodiment of the present invention, the extra information includes a non virgin bit (true=bead, false=virgin steel), a slag bit, an undercut value (amount of undercut at this wexel where zero equals no undercut), a porosity value (amount of porosity at this wexel where zero equals no porosity), and a bead wake value which encodes the time at which the bead solidifies. There are a set of image maps associated with different welding coupon visuals including virgin steel, slag, bead, and porosity. These image maps are used both for bump mapping and texture mapping. The amount of blending of these image maps is controlled by the various flags and values described herein.

A bead wake effect is achieved using a 1D image map and a per wexel bead wake value that encodes the time at which a given bit of bead is solidified. Once a hot puddle wexel location is no longer hot enough to be called "puddle", a time is saved at that location and is called "bead wake". The end result is that the shader code is able to use the 1D texture map to draw the "ripples" that give a bead its unique appearance which portrays the direction in which the bead was laid down. In accordance with an alternative embodiment of the present invention, the virtual welding system 100 is capable of simulating, in virtual reality space, and displaying a weld bead having a real-time weld bead wake characteristic resulting from a real-time fluidity-to-solidification transition of the simulated weld puddle, as the simulated weld puddle is moved along a weld trajectory.

In accordance with an alternative embodiment of the present invention, the virtual welding system 100 is capable of teaching a user how to troubleshoot a welding machine. For example, a troubleshooting mode of the system may train a user to make sure he sets up the system correctly (e.g., correct gas flow rate, correct power cord connected, etc.) In accordance with another alternate embodiment of the present invention, the virtual welding system 100 is capable of recording and playing back a welding session (or at least a portion of a welding session, for example, N frames). A track ball may be provided to scroll through frames of video, allowing a user or instructor to critique a welding session. Playback may be provided at selectable speeds as well (e.g., full speed, half speed, quarter speed). In accordance with an embodiment of the present invention, a split-screen playback may be provided, allowing two welding sessions to be viewed side-by-side, for example, on the ODD 150. For example, a "good" welding session may be viewed next to a "poor" welding session for comparison purposes.

In summary, disclosed is a real-time virtual reality welding system including a programmable processor-based subsystem, a spatial tracker operatively connected to the programmable processor-based subsystem, at least one mock welding tool capable of being spatially tracked by the spatial tracker, and at least one display device operatively connected to the programmable processor-based subsystem. The virtual reality welding system is designed to accommodate portable use, wherein a compactable stand is employed to hold a welding coupon in space for use with the mock welding tool. The mock welding tool includes a common base that can couple to a plurality of adapters, wherein each adapter simulates a particular welding type. In this manner, the system is capable of simulating, in virtual reality space, a weld puddle having real-time molten metal fluidity and heat dissipation characteristics. The system is further capable of displaying the simulated weld puddle on the display device in real-time.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising". As utilized herein, the terms "datum" and "datum point" refer to a reference from which measurements are made.

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

What is claimed is:

1. A virtual welding system, comprising:
a programmable processor based subsystem;
a spatial tracker operatively connected to the programmable processor based subsystem;
a mock welding tool capable of being spatially tracked by the spatial tracker, the mock welding tool includes,
two or more adapters, wherein each adapter emulates the real-world appearance of a particular weld type; and
a base that is removably coupled to each of the two or more adapters, said base comprising one or more sensors to determine spatial location relative to said spatial tracker; and further wherein
each of said two or more adapters interfacing with said base, and
said programmable processor based subsystem executing an appropriate instruction set associated with each adapter to render a display on a face-mounted display device commensurate for each of said two or more adapters.

2. The virtual welding system of claim 1, further including:
one or more sensors disposed within the base; and
a magnet that has a spatial location, which is tracked by the one or more sensors to identify the relative location of the mock welding tool to the magnet.

3. The virtual welding system of claim 2, further including:
a welding coupon having at least one surface and simulating a real world part to be welded, the welding coupon is disposed a known distance from the magnet, the welding coupon having at least one surface and simulating a real-world part to be welded, wherein said at least one surface of said welding coupon is simulated in said virtual reality space as a double displacement layer including a solid displacement layer and a puddle displacement layer, wherein said puddle displacement layer is capable of modifying said solid displacement layer.

4. The virtual welding system of claim 3, further including:
a stand which is utilized to support the magnet and the welding coupon in a predetermined spatial relationship.

5. The virtual welding system of claim 1, further including:
a helmet that is worn by a user; and
a face mounted display device disposed within the helmet, which displays real time molten metal fluidity and heat dissipation characteristics of the simulated weld puddle to provide real time visual feedback to a user of the mock welding tool when displayed on the face mounted display device, allowing the user to adjust her or maintain a welding technique in real time in response to the real time visual feedback.

6. The system of claim 5, wherein
the helmet location is determined by the spatial tracker and communicated to the programmable processor based subsystem.

7. The system of claim 6, further including:
one or more sensors disposed within the helmet to track the spatial location of the helmet relative to the magnet.

8. The system of claim 7, wherein
the sensors are one or more of a capacitance sensor, a piezoelectric sensors, an infrared proximity sensor, a hall effect sensor, an eddy current sensor, an inductive sensor, and an ultrasonic sensor.

9. A mock welding tool used within a virtual welding system, comprising:
two or more adapters, each adapter emulates the physical characteristics of a particular weld type; and
a base which is removably coupled to each of the two or more adapters, the base identifies a real time spatial location of the mock welding tool relative to a datum location, said base comprising one or more sensors to determine spatial location relative to said spatial tracker; and further wherein
each of said two or more adapters interfacing with said base, and
a programmable processor based subsystem executing an appropriate instruction set associated with each adapter to render a display on a face-mounted display device commensurate for each of said two or more adapters.

10. The system of claim 9, wherein
the datum point is a welding coupon having at least one surface in simulating a real world part to be welded, the welding coupon having at least one surface and simulating a real-world part to be welded, wherein said at least one surface of said welding coupon is simulated in said virtual reality space as a double displacement layer including a solid displacement layer and a puddle displacement layer, wherein said puddle displacement layer is capable of modifying said solid displacement layer.

11. The system of claim 10, further including:
a magnet that is disposed in a predetermined location relative to the welding coupon.

12. The system of claim 11, further including:
a stand that fixes the spatial location of the magnet relative to the welding coupon.

13. The system of claim 12, further including:
one or more sensors that are disposed within the base, the one or more sensors determine the location of the base relative to the magnet.

14. The system of claim 13, wherein the sensors communicate their locations to the programmable processor based subsystem.

15. The system of claim 14, further including:
an interface disposed at a first end of the base, the interface facilitates the removable mechanical coupling with each of the one or more adapters.

16. The system of claim 15, wherein
the interface includes at least one first mechanical feature that is complimentary to at least one second mechanical feature within the adapter to facilitate removable mechanical coupling of each adapter to the base.

17. The system of claim 9, wherein
the base further includes a trigger that is used to indicate an active weld state within a virtual welding system.

18. The system of claim 9, wherein
the trigger is engaged via a sleeve within each adapter, the sleeve is mechanically manipulated to initiate an active weld state by a user via the adapter.

19. A method of using a mock welding tool within a virtual welding system, comprising:
removably connecting a first adapter to a base, the first adapter is associated with a first weld type;
identifying said first adapter to a programmable processor-based subsystem to allow said system to load and execute an appropriate instruction set associated with said first adapter and rendering said instruction set as a display on a face-mounted display device;
removing the first adapter from the base; and
removably connecting a second adapter to the same base, the second adapter is associated with a second weld type;
identifying said second adapter to said programmable processor-based subsystem to allow said system to load and execute an appropriate instruction set associated with said second adapter and rendering said instruction set as a display on a face-mounted display device;
wherein the base includes a sensor that determines the spatial location of the mock welding tool relative to a welding coupon, wherein the location of the base is updated in real time to a display.

20. The method of claim 19, further including:
a magnet disposed at a known location relative to the welding coupon, wherein the sensor determines the location of the magnet and computes the location of the welding coupon based at least upon the location of the magnet.

21. The method of claim 19, further including:
moving the mock welding tool with the first adapter with respect to a welding coupon in accordance with a first welding technique;
tracking the mock welding tool with the first adapter in three-dimensional space using said virtual reality welding system;
viewing a display of said virtual reality welding system showing a real-time virtual reality simulation of the mock welding tool with the first adapter and the welding coupon in a virtual reality space as the simulated mock welding tool with the first adapter deposits a first simulated weld bead material onto at least one simulated surface of said simulated welding coupon by forming a simulated weld puddle in the vicinity of a simulated arc emitting from the mock welding tool with the first adapter;
viewing, on said display, first real-time molten metal fluidity and heat dissipation characteristics of said first simulated weld puddle; and
modifying, in real-time, at least one aspect of said first welding technique in response to viewing said first real-time molten metal fluidity and heat dissipation characteristics of said first simulated weld puddle.

22. The method of claim 19, further including:
moving the mock welding tool with the second adapter with respect to a welding coupon in accordance with a second welding technique;
tracking the mock welding tool with the second adapter in three-dimensional space using said virtual reality welding system;
viewing a display of said virtual reality welding system showing a real-time virtual reality simulation of the mock welding tool with the second adapter and said welding coupon in a virtual reality space as the simulated mock welding tool with the second adapter deposits a second simulated weld bead material onto at least one simulated surface of said simulated welding coupon by forming a second simulated weld puddle in the vicinity of a simulated arc emitting from said simulated mock welding tool with the second adapter;
viewing, on said display, a second real-time molten metal fluidity and heat dissipation characteristics of the second simulated weld puddle; and
modifying, in real-time, at least one aspect of the second welding technique in response to viewing the second real-time molten metal fluidity and heat dissipation characteristics of the second simulated weld puddle.

* * * * *